(12) United States Patent
Osborn et al.

(10) Patent No.: US 12,354,104 B2
(45) Date of Patent: Jul. 8, 2025

(54) METHODS AND ARRANGEMENTS FOR PROOF OF PURCHASE

(71) Applicant: Capital One Services, LLC, McLean, VA (US)

(72) Inventors: Kevin Osborn, Newton, MA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 111 days.

(21) Appl. No.: 17/883,968

(22) Filed: Aug. 9, 2022

(65) Prior Publication Data
US 2024/0054493 A1   Feb. 15, 2024

(51) Int. Cl.
*G06Q 20/40* (2012.01)
*G06Q 20/38* (2012.01)
(Continued)

(52) U.S. Cl.
CPC ..... *G06Q 20/4014* (2013.01); *G06Q 20/3827* (2013.01); *G06Q 30/0627* (2013.01);
(Continued)

(58) Field of Classification Search
CPC ........... G06Q 20/4014; G06Q 20/3827; G06Q 30/0627; G06Q 30/0637; G06Q 2220/00;
(Continued)

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Radu Andrei
*Assistant Examiner* — Nakia Leffall-Allen
(74) *Attorney, Agent, or Firm* — KDW Firm PLLC

(57) ABSTRACT

Logic may provide enforce a rate limit for product offers and generate a product token associated for product authentication. Logic may determine a rate limit associated with the product based on an identity of the consumer in a cryptogram for a transaction. Logic may compare the rate limit with a quantity of purchases of the product with a payment instrument provided for payment for the transaction, the rate limit to limit purchases of the product via the payment instrument or by the consumer associated with the payment instrument. Logic may approve the transaction based on comparison of the rate limit in response to the rate limit being greater than purchases of the product. Logic may create a product token via the cryptogram, the product token encoded via the cryptogram, the product token to uniquely identify the product and logic may cause transmission of the product token to the consumer.

20 Claims, 17 Drawing Sheets

(51) Int. Cl.
*G06Q 30/0601* (2023.01)
*H04L 9/32* (2006.01)

(52) U.S. Cl.
CPC ....... *G06Q 30/0637* (2013.01); *H04L 9/3213* (2013.01); *H04L 9/3242* (2013.01); *G06Q 2220/00* (2013.01)

(58) Field of Classification Search
CPC .......... G06Q 30/0607; G06Q 20/3226; G06Q 20/3278; G06Q 20/341; G06Q 20/352; G06Q 20/353; G06Q 30/0185; G06Q 30/0609; H04L 9/3213; H04L 9/3242; G06F 21/34
See application file for complete search history.

(56) References Cited

U.S. PATENT DOCUMENTS

| | | | |
|---|---|---|---|
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,592,553 A | 1/1997 | Guski et al. | |
| 5,616,901 A | 4/1997 | Crandall | |
| 5,666,415 A | 9/1997 | Kaufman | |
| 5,763,373 A | 6/1998 | Robinson et al. | |
| 5,764,789 A | 6/1998 | Pare, Jr. et al. | |
| 5,768,373 A | 6/1998 | Lohstroh et al. | |
| 5,778,072 A | 7/1998 | Samar | |
| 5,796,827 A | 8/1998 | Coppersmith et al. | |
| 5,832,090 A | 11/1998 | Raspotnik | |
| 5,883,810 A | 3/1999 | Franklin et al. | |
| 5,901,874 A | 5/1999 | Deters | |
| 5,929,413 A | 7/1999 | Gardner | |
| 5,960,411 A | 9/1999 | Hartman et al. | |
| 6,021,203 A | 2/2000 | Douceur et al. | |
| 6,049,328 A | 4/2000 | Vanderheiden | |
| 6,058,373 A | 5/2000 | Blinn et al. | |
| 6,061,666 A | 5/2000 | Do et al. | |
| 6,105,013 A | 8/2000 | Curry et al. | |
| 6,199,114 B1 | 3/2001 | White et al. | |
| 6,199,762 B1 | 3/2001 | Hohle | |
| 6,216,227 B1 | 4/2001 | Goldstein et al. | |
| 6,227,447 B1 | 5/2001 | Campisano | |
| 6,282,522 B1 | 8/2001 | Davis et al. | |
| 6,324,271 B1 | 11/2001 | Sawyer et al. | |
| 6,342,844 B1 | 1/2002 | Rozin | |
| 6,367,011 B1 | 4/2002 | Lee et al. | |
| 6,402,028 B1 | 6/2002 | Graham, Jr. et al. | |
| 6,438,550 B1 | 8/2002 | Doyle et al. | |
| 6,501,847 B2 | 12/2002 | Helot et al. | |
| 6,631,197 B1 | 10/2003 | Taenzer | |
| 6,641,050 B2 | 11/2003 | Kelley et al. | |
| 6,655,585 B2 | 12/2003 | Shinn | |
| 6,662,020 B1 | 12/2003 | Aaro et al. | |
| 6,721,706 B1 | 4/2004 | Strubbe et al. | |
| 6,731,778 B1 | 5/2004 | Oda et al. | |
| 6,779,115 B1 | 8/2004 | Naim | |
| 6,792,533 B2 | 9/2004 | Jablon | |
| 6,829,711 B1 | 12/2004 | Kwok et al. | |
| 6,834,271 B1 | 12/2004 | Hodgson et al. | |
| 6,834,795 B1 | 12/2004 | Rasmussen et al. | |
| 6,852,031 B1 | 2/2005 | Rowe | |
| 6,865,547 B1 | 3/2005 | Brake, Jr. et al. | |
| 6,873,260 B2 | 3/2005 | Lancos et al. | |
| 6,877,656 B1 | 4/2005 | Jaros et al. | |
| 6,889,198 B2 | 5/2005 | Kawan | |
| 6,905,411 B2 | 6/2005 | Nguyen et al. | |
| 6,910,627 B1 | 6/2005 | Simpson-Young et al. | |
| 6,971,031 B2 | 11/2005 | Haala | |
| 6,990,588 B1 | 1/2006 | Yasukura | |
| 7,006,986 B1 | 2/2006 | Sines et al. | |
| 7,085,931 B1 | 8/2006 | Smith et al. | |
| 7,127,605 B1 | 10/2006 | Montgomery et al. | |
| 7,128,274 B2 | 10/2006 | Kelley et al. | |
| 7,140,550 B2 | 11/2006 | Ramachandran | |
| 7,152,045 B2 | 12/2006 | Hoffman | |
| 7,165,727 B2 | 1/2007 | de Jong | |
| 7,175,076 B1 | 2/2007 | Block et al. | |
| 7,202,773 B1 | 4/2007 | Oba et al. | |
| 7,206,806 B2 | 4/2007 | Pineau | |
| 7,232,073 B1 | 6/2007 | de Jong | |
| 7,246,752 B2 | 7/2007 | Brown | |
| 7,254,569 B2 | 8/2007 | Goodman et al. | |
| 7,263,507 B1 | 8/2007 | Brake, Jr. et al. | |
| 7,270,276 B2 | 9/2007 | Vayssiere | |
| 7,278,025 B2 | 10/2007 | Saito et al. | |
| 7,287,692 B1 | 10/2007 | Patel et al. | |
| 7,290,709 B2 | 11/2007 | Tsai et al. | |
| 7,306,143 B2 | 12/2007 | Bonneau, Jr. et al. | |
| 7,319,986 B2 | 1/2008 | Praisner et al. | |
| 7,325,132 B2 | 1/2008 | Takayama et al. | |
| 7,373,515 B2 | 5/2008 | Owen et al. | |
| 7,374,099 B2 | 5/2008 | de Jong | |
| 7,375,616 B2 | 5/2008 | Rowse et al. | |
| 7,380,710 B2 | 6/2008 | Brown | |
| 7,424,977 B2 | 9/2008 | Smets et al. | |
| 7,453,439 B1 | 11/2008 | Kushler et al. | |
| 7,472,829 B2 | 1/2009 | Brown | |
| 7,487,357 B2 | 2/2009 | Smith et al. | |
| 7,568,631 B2 | 8/2009 | Gibbs et al. | |
| 7,584,153 B2 | 9/2009 | Brown et al. | |
| 7,597,250 B2 | 10/2009 | Finn | |
| 7,628,322 B2 | 12/2009 | Holtmanns et al. | |
| 7,652,578 B2 | 1/2010 | Braun et al. | |
| 7,689,832 B2 | 3/2010 | Talmor et al. | |
| 7,703,142 B1 | 4/2010 | Wilson et al. | |
| 7,748,609 B2 | 7/2010 | Sachdeva et al. | |
| 7,748,617 B2 | 7/2010 | Gray | |
| 7,748,636 B2 | 7/2010 | Finn | |
| 7,762,457 B2 | 7/2010 | Bonalle et al. | |
| 7,789,302 B2 | 9/2010 | Tame | |
| 7,793,851 B2 | 9/2010 | Mullen | |
| 7,796,013 B2 | 9/2010 | Murakami et al. | |
| 7,801,799 B1 | 9/2010 | Brake, Jr. et al. | |
| 7,801,829 B2 | 9/2010 | Gray et al. | |
| 7,805,755 B2 | 9/2010 | Brown et al. | |
| 7,809,643 B2 | 10/2010 | Phillips et al. | |
| 7,827,115 B2 | 11/2010 | Weller et al. | |
| 7,828,214 B2 | 11/2010 | Narendra et al. | |
| 7,848,746 B2 | 12/2010 | Juels | |
| 7,882,553 B2 | 2/2011 | Tuliani | |
| 7,900,048 B2 | 3/2011 | Andersson | |
| 7,908,216 B1 | 3/2011 | Davis et al. | |
| 7,922,082 B2 | 4/2011 | Muscato | |
| 7,933,589 B1 | 4/2011 | Mamdani et al. | |
| 7,949,559 B2 | 5/2011 | Freiberg | |
| 7,954,716 B2 | 6/2011 | Narendra et al. | |
| 7,954,723 B2 | 6/2011 | Charrat | |
| 7,962,369 B2 | 6/2011 | Rosenberg | |
| 7,993,197 B2 | 8/2011 | Kaminkow | |
| 8,005,426 B2 | 8/2011 | Huomo et al. | |
| 8,010,405 B1 | 8/2011 | Bortolin et al. | |
| RE42,762 E | 9/2011 | Shin et al. | |
| 8,041,954 B2 | 10/2011 | Plesman | |
| 8,060,012 B2 | 11/2011 | Sklovsky et al. | |
| 8,074,877 B2 | 12/2011 | Mullen et al. | |
| 8,082,450 B2 | 12/2011 | Frey et al. | |
| 8,095,113 B2 | 1/2012 | Kean et al. | |
| 8,099,332 B2 | 1/2012 | Lemay et al. | |
| 8,103,249 B2 | 1/2012 | Markison | |
| 8,108,687 B2 | 1/2012 | Ellis et al. | |
| 8,127,143 B2 | 2/2012 | Abdallah et al. | |
| 8,135,648 B2 | 3/2012 | Oram et al. | |
| 8,140,010 B2 | 3/2012 | Symons et al. | |
| 8,141,136 B2 | 3/2012 | Lee et al. | |
| 8,150,321 B2 | 4/2012 | Winter et al. | |
| 8,150,767 B2 | 4/2012 | Wankmueller | |
| 8,186,602 B2 | 5/2012 | Itay et al. | |
| 8,196,131 B1 | 6/2012 | von Behren et al. | |
| 8,215,563 B2 | 7/2012 | Levy et al. | |
| 8,224,753 B2 | 7/2012 | Atef et al. | |

(56) References Cited

U.S. PATENT DOCUMENTS

| | | |
|---|---|---|
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,885,410 B1 | 1/2021 | Rule et al. |
| 10,909,544 B1 | 2/2021 | Osborn et al. |
| 11,080,697 B2 * | 8/2021 | Lakka .............. G06Q 20/401 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |

(56) References Cited

U.S. PATENT DOCUMENTS

| | | |
|---|---|---|
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0202574 A1* | 8/2012 | Stanek ............... G07F 17/3272 463/17 |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |

(56) References Cited

U.S. PATENT DOCUMENTS

| | | | |
|---|---|---|---|
| 2014/0180851 A1 | 6/2014 | Fisher | |
| 2014/0208112 A1 | 7/2014 | McDonald et al. | |
| 2014/0214674 A1 | 7/2014 | Narula | |
| 2014/0229375 A1 | 8/2014 | Zaytzsev et al. | |
| 2014/0245391 A1 | 8/2014 | Adenuga | |
| 2014/0256251 A1 | 9/2014 | Caceres et al. | |
| 2014/0258099 A1 | 9/2014 | Rosano | |
| 2014/0258113 A1 | 9/2014 | Gauthier et al. | |
| 2014/0258125 A1 | 9/2014 | Gerber et al. | |
| 2014/0274179 A1 | 9/2014 | Zhu et al. | |
| 2014/0279479 A1 | 9/2014 | Maniar et al. | |
| 2014/0337235 A1 | 11/2014 | Van Heerden et al. | |
| 2014/0339315 A1 | 11/2014 | Ko | |
| 2014/0346860 A1 | 11/2014 | Aubry et al. | |
| 2014/0365780 A1 | 12/2014 | Movassaghi | |
| 2014/0379361 A1 | 12/2014 | Mahadkar et al. | |
| 2015/0012444 A1 | 1/2015 | Brown et al. | |
| 2015/0032635 A1 | 1/2015 | Guise | |
| 2015/0071486 A1 | 3/2015 | Rhoads et al. | |
| 2015/0088757 A1 | 3/2015 | Zhou et al. | |
| 2015/0089586 A1 | 3/2015 | Ballesteros | |
| 2015/0134452 A1 | 5/2015 | Williams | |
| 2015/0140960 A1 | 5/2015 | Powell et al. | |
| 2015/0154595 A1 | 6/2015 | Collinge et al. | |
| 2015/0170138 A1 | 6/2015 | Rao | |
| 2015/0178724 A1 | 6/2015 | Ngo et al. | |
| 2015/0186871 A1 | 7/2015 | Laracey | |
| 2015/0205379 A1 | 7/2015 | Mag et al. | |
| 2015/0302409 A1 | 10/2015 | Malek et al. | |
| 2015/0317626 A1 | 11/2015 | Ran et al. | |
| 2015/0332266 A1 | 11/2015 | Friedlander et al. | |
| 2015/0339474 A1 | 11/2015 | Paz et al. | |
| 2015/0371234 A1 | 12/2015 | Huang et al. | |
| 2016/0012465 A1 | 1/2016 | Sharp | |
| 2016/0026997 A1 | 1/2016 | Tsui et al. | |
| 2016/0048913 A1 | 2/2016 | Rausaria et al. | |
| 2016/0055480 A1 | 2/2016 | Shah | |
| 2016/0057619 A1 | 2/2016 | Lopez | |
| 2016/0065370 A1 | 3/2016 | Le Saint et al. | |
| 2016/0087957 A1 | 3/2016 | Shah et al. | |
| 2016/0092696 A1 | 3/2016 | Guglani et al. | |
| 2016/0148193 A1 | 5/2016 | Kelley et al. | |
| 2016/0180306 A1* | 6/2016 | Koeppel | G06Q 20/341 705/41 |
| 2016/0232523 A1 | 8/2016 | Venot et al. | |
| 2016/0239672 A1 | 8/2016 | Khan et al. | |
| 2016/0253651 A1 | 9/2016 | Park et al. | |
| 2016/0255072 A1 | 9/2016 | Liu | |
| 2016/0267486 A1 | 9/2016 | Mitra et al. | |
| 2016/0277383 A1 | 9/2016 | Guyomarc'h et al. | |
| 2016/0277388 A1 | 9/2016 | Lowe et al. | |
| 2016/0307187 A1 | 10/2016 | Guo et al. | |
| 2016/0307189 A1 | 10/2016 | Zarakas et al. | |
| 2016/0314472 A1 | 10/2016 | Ashfield | |
| 2016/0330027 A1 | 11/2016 | Ebrahimi | |
| 2016/0335531 A1 | 11/2016 | Mullen et al. | |
| 2016/0379217 A1 | 12/2016 | Hammad | |
| 2017/0004502 A1 | 1/2017 | Quentin et al. | |
| 2017/0011395 A1 | 1/2017 | Pillai et al. | |
| 2017/0011406 A1 | 1/2017 | Tunnell et al. | |
| 2017/0017957 A1 | 1/2017 | Radu | |
| 2017/0017964 A1 | 1/2017 | Janefalkar et al. | |
| 2017/0024716 A1 | 1/2017 | Jiam et al. | |
| 2017/0039566 A1 | 2/2017 | Schipperheijn | |
| 2017/0041759 A1 | 2/2017 | Gantert et al. | |
| 2017/0068950 A1 | 3/2017 | Kwon | |
| 2017/0103388 A1 | 4/2017 | Pillai et al. | |
| 2017/0104739 A1 | 4/2017 | Lansler et al. | |
| 2017/0109509 A1 | 4/2017 | Baghdasaryan | |
| 2017/0109730 A1 | 4/2017 | Locke et al. | |
| 2017/0116447 A1 | 4/2017 | Cimino et al. | |
| 2017/0124568 A1 | 5/2017 | Moghadam | |
| 2017/0140379 A1 | 5/2017 | Deck | |
| 2017/0154328 A1 | 6/2017 | Zarakas et al. | |
| 2017/0154333 A1 | 6/2017 | Gleeson et al. | |
| 2017/0180134 A1 | 6/2017 | King | |
| 2017/0230189 A1 | 8/2017 | Toll et al. | |
| 2017/0237301 A1 | 8/2017 | Elad et al. | |
| 2017/0289127 A1 | 10/2017 | Hendrick | |
| 2017/0295013 A1 | 10/2017 | Claes | |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0046994 A1* | 2/2018 | Maenpaa | G06Q 20/2295 |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0238517 A1 | 8/2019 | D'Agostino et al. | |
| 2020/0106616 A1 | 4/2020 | Rule et al. | |
| 2022/0036361 A1* | 2/2022 | Johnson | G06Q 20/40145 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

(56) References Cited

FOREIGN PATENT DOCUMENTS

| WO | WO-2021230807 A1 * | 11/2021 | ............ G06Q 20/10 |
| WO | WO-2023069689 A2 * | 4/2023 | ............ G06Q 10/06 |

OTHER PUBLICATIONS

Haykin, M. and Warnar, R., "Smart Card Technology: New Methods for Computer Access Control", Computer Science and Technology NIST Special Publication 500-157:1-60 (1988).
Lehpamer, H., "Component of the RFID System", RFID Design Principles, 2nd edition pp. 133-201 (2012).
Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.
Author Unknown, "Visa® Account Updater for Merchants", [online] 2019 [retrieved on Mar. 25, 2019]. Retrieved from Internet URL: https://USA.visa.com/dam/VCOM/download/merchants/visa-account-updater-product-information-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD ?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.

(56) References Cited

OTHER PUBLICATIONS

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

International Search Report and Written Opinion mailed Nov. 6, 2023, for corresponding PCT/US2023/028098 (13 pages).

\* cited by examiner

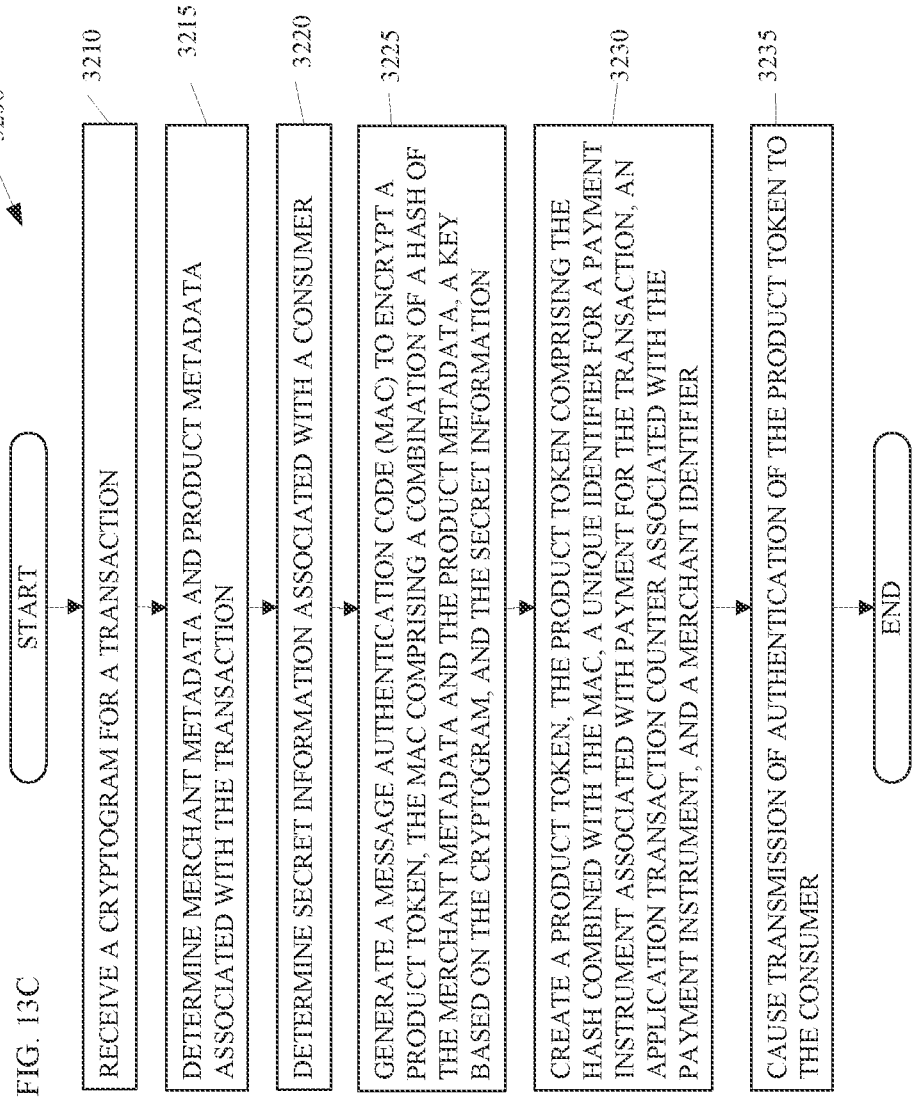

METHODS AND ARRANGEMENTS FOR PROOF OF PURCHASE

TECHNICAL FIELD

Embodiments described herein are in the field of proof of purchase. More particularly, the embodiments relate to methods and arrangements to limit purchase rate of limited product offerings for a customer, generate a product token, and authenticate the limited products after purchase via the product token.

BACKGROUND

Organizations and product originators may offer limited quantity and special edition merchandise or products to build brand loyalty in consumers and address specific collectors' markets. Too often people take advantage of technology such as virtual credit cards and bots to buy more products than intended per customer and resell the products at a profit. Such actions artificially raise costs for and disadvantage ordinary consumers, which, in turn, causes bad feelings toward the brand of the product originator and/or the organization organizing the sales of the products.

After the sale of a special edition product, numerous counterfeit products may be sold, which can deceive the ordinary consumers. Contemporary systems do not offer easy and convenient ways to authenticate the products sold after the original product sales.

Such situations can, in some instances, cause a negative impression related to the product offerings, which is neither helpful nor conducive toward cultivating brand loyalty with the consumers.

SUMMARY

Embodiments may include various types of subject matter such as methods, apparatuses, systems, storage media, and/or the like. One embodiment may include a system comprising: memory; and logic circuitry coupled with the memory. In some embodiments, the logic circuitry may identify the consumer based on a message with a cryptogram provided by the consumer associated with a transaction for a product. The logic circuitry may determine a physical presence of a payment instrument for the transaction based on the message with the cryptogram. The logic circuitry may determine a rate limit associated with the product. The logic circuitry may compare the rate limit against purchases of the product with the payment instrument, the rate limit to limit purchases of the product via the payment instrument or by the consumer associated with the payment instrument. The logic circuitry may approve the transaction based on comparison of the rate limit in response to the rate limit being greater than purchases of the product. In some embodiments, the logic circuitry may generate a product token via the cryptogram. The product token may be encoded via the cryptogram and the product token may uniquely identify the product and the transaction. In some embodiments, the logic circuitry may cause transmission of the product token to the consumer.

Another embodiment may comprise a non-transitory storage medium containing instructions, which when executed by a processor, cause the processor to perform operations. The operations may determine a rate limit associated with the product based on an identity of the consumer in a cryptogram for a transaction. The logic circuitry may compare the rate limit with a quantity of purchases of the product with a payment instrument provided for payment for the transaction. The rate limit may limit purchases of the product via the payment instrument or by the consumer associated with the payment instrument. In some embodiments, the logic circuitry may approve the transaction based on comparison of the rate limit in response to the rate limit being greater than purchases of the product. The logic circuitry may create a product token via the cryptogram. The product token may be encoded via the cryptogram and the product token may uniquely identify the product. In some embodiments, the logic circuitry may cause transmission of the product token to the consumer.

Yet another embodiment may comprise a system. The system may comprise memory and logic circuitry coupled with the memory. The logic circuitry may receive a cryptogram for a transaction. The logic circuitry may determine transaction metadata and product metadata associated with the transaction. The logic circuitry may determine secret information associated with a consumer. The logic circuitry may generate a message authentication code (MAC) to encrypt a product token, the MAC comprising a combination of a hash of the transaction metadata and the product metadata, a key based on the cryptogram, and the secret information. The logic circuitry may create a product token. The product token may comprise the hash combined with the MAC, a unique identifier for a payment instrument associated with payment for the transaction, an application transaction counter associated with the payment instrument, and a merchant identifier. In some embodiments, the logic circuitry may cause transmission of authentication of the product token to the consumer.

BRIEF DESCRIPTION OF THE DRAWINGS

FIGS. 13A-C depict flowcharts of embodiments for rate limitation, token creation, and token validation, by token logic circuitry, such as the token logic circuitry shown in FIGS. 11 and 12;

DETAILED DESCRIPTION OF EMBODIMENTS

Figure 1:
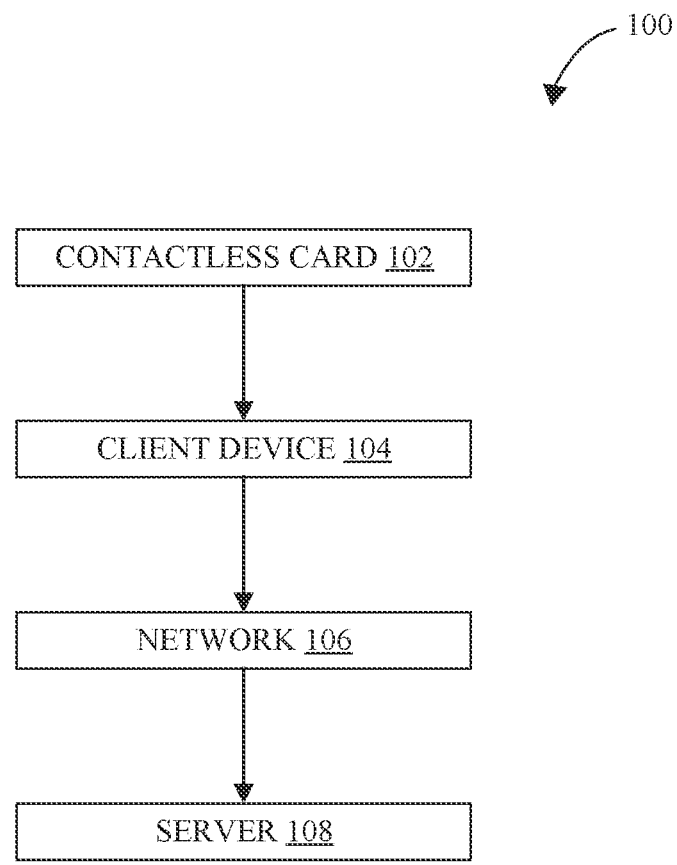
FIG. 1 illustrates an aspect of the subject matter in accordance with one embodiment.

The following is a detailed description of embodiments depicted in the drawings. The detailed description covers all modifications, equivalents, and alternatives falling within the appended claims.

Embodiments discussed herein can generally facilitate rate limited sales of products, generate a product token to authenticate the product, and authenticate the product after the initial purchase of the product. Embodiments may comprise token logic circuitry to enforce rate limitations on purchases of products, create product tokens, and/or validate product tokens. While some embodiments may illustrate some or all these functions in a single server or device, other embodiments may separate the token logic circuitry into more than one servers, devices, apparatuses, and/or the like. For instance, in some embodiments, the rate limitation logic circuitry may reside in a first set of one or more devices or servers, the token creation logic circuitry may reside in a second set of one or more devices or servers, and the token validation logic circuitry may reside in a third set of one or more devices or servers. In some embodiments, the first, second, and third sets of devices or servers may overlap at least partially and, in other embodiments, the sets of servers may comprise servers dynamically selected from a pool of servers based on availability, geographical location, proximity to other application servers or data servers, and/or the like.

The token logic circuitry may perform rate limitation for purchases of, e.g., limited-edition or special edition products, to provide a measure of fairness to distribution of the products. In some embodiments, the token logic circuitry may receive or generate transaction information related to a pending transaction by a consumer via a contactless card or other form of a payment instrument such as an electronic wallet application on a smart phone. The transaction information may include a cryptogram generated by the payment instrument as part of the processing of the transaction with a merchant. The cryptogram may be accompanied by a unique identifier such as a presto unique identifier, an application transaction counter value such as a presto application transaction counter value, and an applet version to indicate the applet associated with the application transaction counter and/or the encryption of the cryptogram.

Based on the unique identifier, the token logic circuitry may access customer profile information to identify the customer, information about the payment instrument, and purchases by the consumer or the payment instrument that are subject to the rate limit. The token logic circuitry may compare the number of product purchases made by the consumer or the payment instrument against the rate limit for the product to determine if the transaction for the product can be approved. If the rate limit is greater than the number of product purchases by the consumer (or with the payment instrument) that are subject to the rate limit, the token logic circuitry may approve the transaction for further processing. On the other hand, if the number of purchases of products subject to the rate limit has reached or exceeded the rate limit for the product, the token logic circuitry may deny or disapprove the transaction to buy the product.

Once the transaction is otherwise approved, the token logic circuitry may generate a product token for the transaction to purchase the product to uniquely identify the product and, in some embodiments, the transaction to purchase the product. The product token may comprise a digital product token or a physical product token. The digital product token may comprise a data file, an applet, or a combination of a data file with an applet. The physical product token may comprise a physical embodiment of the data file, applet, or combination of the data file with the applet. For instance, the physical product token may comprise a QR code, bar code, and/or the like. In some embodiments, the physical product token may be transmitted to the consumer via physically via a mail service and/or in an electronic file that the consumer may print or display on the screen of, e.g., a smart phone.

The token logic circuitry may also include a token validation service that can authenticate a product after the sale of the product to the consumer. For instance, the product may comprise a pair of shoes previously owned by a famous sports player and the shoes may be sold at an auction. The consumer may use a payment instrument to purchase the pair of shoes and the payment instrument may provide a cryptogram to the token logic circuitry along with unencrypted information such as a transaction counter and a unique identifier. The merchant such as the auction house may provide transaction metadata such as a merchant identifier, a transaction identifier, a price, and/or the like to the token logic circuitry. The product originator such as the famous sports player, or the auction house on behalf of the famous sports player, may provide product metadata to the token logic circuitry to describe the product. In many embodiments, the product metadata may comprise metadata about the product that uniquely describes the product such as a picture of the pair of shoes and/or other information that uniquely describes the pair of shoes. In some embodiments, the product metadata may include, e.g., the size of the shoes, the color(s) of the shoes, the manufacturer of the shoes, the model of the shoes, the serial number of the shoes, a description of abrasions or other wear and tear, a picture of the shoes, a certificate of authenticity, a combination thereof, and/or the like. In some embodiments, the consumer may also provide via, e.g., an out of band channel, secret information that is not included in or with the cryptogram.

The token logic circuitry may create a token based on hashes of the metadata and a key based on the cryptogram and possibly the secret information. In some embodiments, the key may comprise an asymmetric key such as a key of a public/private key pair or a symmetric key such as the cryptogram combined with the secret information and the hash of the metadata. In some embodiments, the token logic circuitry may determine a key to encrypt the product token based on a derived or diversified key used to encrypt the cryptogram. The derived or diversified key may comprise, e.g., an encryption session key or an authentication session key.

The token validation service of the token logic circuitry may gather the cryptogram, the metadata, and the secret information from the consumer to decrypt the product token and authenticate the pair of shoes from the famous sports player for the consumer. The consumer may use the token verification service to verify that the item received by the consumer is the genuine pair of shoes from the famous sports player and/or verify the authenticity of the pair of shoes for a subsequent purchaser of the pair of shoes.

Several embodiments comprise systems with multiple processor cores such as central servers, modems, routers, switches, servers, workstations, netbooks, mobile devices (Laptop, Smart Phone, Tablet, and the like), and the like. In various embodiments, these systems relate to specific applications such as healthcare, home, commercial office and retail, security, industrial automation and monitoring applications, financial services, and the like.

FIG. 1 illustrates a data transmission system 100 according to an example embodiment. As further discussed below, system 100 may include contactless card 102 (also referred to as a payment instrument), client device 104, network 106, and server 108. Although FIG. 1 illustrates single instances of the components, system 100 may include any number of components.

System 100 may include one or more contactless cards 102, which are further explained below. In some embodiments, contactless card 102 may be in wireless communication, utilizing NFC in an example, with client device 104.

System 100 may include client device 104, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. client device 104 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 104 device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 104 of system 100 may execute one or more applications, such as software applications, that enable, for example, network communications with one or more components of system 100 and transmit and/or receive data.

The client device 104 may be in communication with one or more server(s) 108 via one or more network(s) 106, and may operate as a respective front-end to back-end pair with server 108. The client device 104 may transmit, for example from a mobile device application executing on client device 104, one or more requests to server 108. The one or more requests may be associated with retrieving data from server 108. The server 108 may receive the one or more requests from client device 104. Based on the one or more requests from client device 104, server 108 may be configured to retrieve the requested data from one or more databases (not shown). Based on receipt of the requested data from the one or more databases, server 108 may be configured to transmit the received data to client device 104, the received data being responsive to one or more requests.

System 100 may include one or more networks 106. In some examples, network 106 may be one or more of a wireless network, a wired network or any combination of wireless network and wired network, and may be configured to connect client device 104 to server 108. For example, network 106 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family of networking, Bluetooth, NFC, Radio Frequency Identification (RFID), Wi-Fi, and/or the like.

In addition, network 106 may include, without limitation, telephone lines, fiber optics, IEEE Ethernet 802.3, a wide area network, a wireless personal area network, a LAN, or a global network such as the Internet. In addition, network 106 may support an Internet network, a wireless communication network, a cellular network, or the like, or any combination thereof. network 106 may further include one network, or any number of the exemplary types of networks mentioned above, operating as a stand-alone network or in cooperation with each other. network 106 may utilize one or more protocols of one or more network elements to which they are communicatively coupled. network 106 may translate to or from other protocols to one or more protocols of network devices. Although network 106 is depicted as a single network, it should be appreciated that according to one or more examples, network 106 may comprise a plurality of interconnected networks, such as, for example, the Internet, a service provider's network, a cable television network, corporate networks, such as credit card association networks, and home networks.

System 100 may include one or more servers 108. In some examples, server 108 may include one or more processors, which are coupled to memory. The server 108 may be configured as a central system, server or platform to control and call various data at different times to execute a plurality of workflow actions. Server 120 may be configured to connect to the one or more databases. The server 108 may be connected to at least one client device 104.

Figure 2:
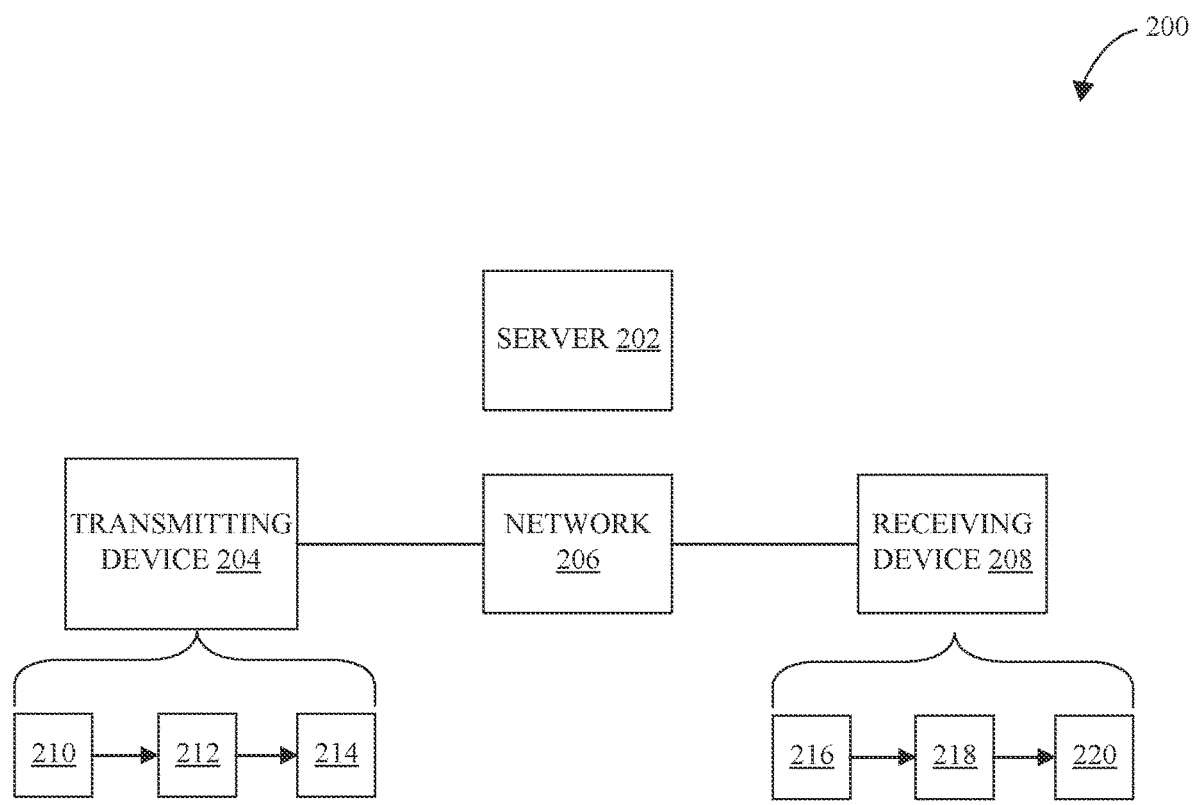
FIG. 2 illustrates an aspect of the subject matter in accordance with one embodiment.

FIG. 2 illustrates a data transmission system according to an example embodiment. System 200 may include client devices such as a transmitting or transmitting device 204, a receiving or receiving device 208 in communication, for example via network 206, with one or more servers 202. Transmitting or transmitting device 204 may be the same as, or similar to, client device 110 discussed above with reference to FIG. 1. Receiving or receiving device 208 may be the same as, or similar to, client device 110 discussed above with reference to FIG. 1. Network 206 may be similar to network 115 discussed above with reference to FIG. 1. Server 202 may be similar to server 120 discussed above with reference to FIG. 1. Although FIG. 2 shows single instances of components of system 200, system 200 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduce exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Referring back to FIG. 2, system 200 may be configured to implement key diversification. For example, a sender and recipient may desire to exchange data (e.g., original sensitive data) via respective devices 204 and 208. As explained above, although single instances of transmitting device 204 and receiving device 208 may be included, it is understood that one or more transmitting devices 204 and one or more receiving devices 208 may be involved so long as each party shares the same shared secret symmetric key. In some examples, the transmitting device 204 and receiving device 208 may be provisioned with the same master symmetric key. Further, it is understood that any party or device holding the same secret symmetric key may perform the functions of the transmitting device 204 and similarly any party holding the same secret symmetric key may perform the functions of the receiving device 208. In some examples, the symmetric key may comprise the shared secret symmetric key which is kept secret from all parties other than the transmitting device 204 and the receiving device 208 involved in exchanging the secure data. It is further understood that both the transmitting device 204 and receiving device 208 may be provided with the same master symmetric key, and further that part of the data exchanged between the transmitting device 204 and receiving device 208 comprises at least a portion of data which may be referred to as the counter value. The counter value may comprise a number that changes each time data is exchanged between the transmitting device 204 and the receiving device 208.

System 200 may include one or more networks 206. In some examples, network 206 may be one or more of a wireless network, a wired network or any combination of wireless network and wired network, and may be configured to connect one or more transmitting devices 204 and one or more receiving devices 208 to server 202. For example, network 206 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family network, Bluetooth, NFC, RFID, Wi-Fi, and/or the like.

In addition, network 206 may include, without limitation, telephone lines, fiber optics, IEEE Ethernet 902.3, a wide area network, a wireless personal area network, a LAN, or a global network such as the Internet. In addition, network 206 may support an Internet network, a wireless communication network, a cellular network, or the like, or any combination thereof. Network 206 may further include one network, or any number of the exemplary types of networks mentioned above, operating as a stand-alone network or in cooperation with each other. Network 206 may utilize one or more protocols of one or more network elements to which they are communicatively coupled. Network 206 may translate to or from other protocols to one or more protocols of network devices. Although network 206 is depicted as a single network, it should be appreciated that according to one or more examples, network 206 may comprise a plurality of interconnected networks, such as, for example, the Internet, a service provider's network, a cable television network, corporate networks, such as credit card association networks, and home networks.

In some examples, one or more transmitting devices 204 and one or more receiving devices 208 may be configured to communicate and transmit and receive data between each other without passing through network 206. For example, communication between the one or more transmitting devices 204 and the one or more receiving devices 208 may occur via at least one of NFC, Bluetooth, RFID, Wi-Fi, and/or the like.

At block 210, when the transmitting device 204 is preparing to process the sensitive data with symmetric cryptographic operation, the sender may update a counter. In addition, the transmitting device 204 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 212, the transmitting device 204 may take the selected cryptographic algorithm, and using the master symmetric key, process the counter value. For example, the sender may select a symmetric encryption algorithm, and use a counter which updates with every conversation between the transmitting device 204 and the receiving device 208. The transmitting device 204 may then encrypt the counter value with the selected symmetric encryption algorithm using the master symmetric key, creating a diversified symmetric key.

In some examples, the counter value may not be encrypted. In these examples, the counter value may be transmitted between the transmitting device 204 and the receiving device 208 at block 212 without encryption.

At block 214, the diversified symmetric key may be used to process the sensitive data before transmitting the result to the receiving device 208. For example, the transmitting device 204 may encrypt the sensitive data using a symmetric encryption algorithm using the diversified symmetric key, with the output comprising the protected encrypted data. The transmitting device 204 may then transmit the protected encrypted data, along with the counter value, to the receiving device 208 for processing.

At block 216, the receiving device 208 may first take the counter value and then perform the same symmetric encryption using the counter value as input to the encryption, and the master symmetric key as the key for the encryption. The output of the encryption may be the same diversified symmetric key value that was created by the sender.

At block 218, the receiving device 208 may then take the protected encrypted data and using a symmetric decryption algorithm along with the diversified symmetric key, decrypt the protected encrypted data.

At block 220, as a result of the decrypting the protected encrypted data, the original sensitive data may be revealed.

The next time sensitive data needs to be sent from the sender to the recipient via respective transmitting device 204 and receiving device 208, a different counter value may be selected producing a different diversified symmetric key. By processing the counter value with the master symmetric key and same symmetric cryptographic algorithm, both the transmitting device 204 and receiving device 208 may independently produce the same diversified symmetric key. This diversified symmetric key, not the master symmetric key, is used to protect the sensitive data.

As explained above, both the transmitting device 204 and receiving device 208 each initially possess the shared master symmetric key. The shared master symmetric key is not used to encrypt the original sensitive data. Because the diversified symmetric key is independently created by both the transmitting device 204 and receiving device 208, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 204 and the receiving device 208 may be governed by symmetric requirements for how often to create a new diversification value, and therefore a new diversified symmetric key. In an embodiment, a new diversification value and therefore an new diversified symmetric key may be created for every exchange between the transmitting device 204 and receiving device 208.

In some examples, the key diversification value may comprise the counter value. Other non-limiting examples of the key diversification value include: a random nonce generated each time a new diversified key is needed, the random nonce sent from the transmitting device 204 to the receiving device 208; the full value of a counter value sent from the transmitting device 204 and the receiving device 208; a portion of a counter value sent from the transmitting device 204 and the receiving device 208; a counter independently maintained by the transmitting device 204 and the receiving device 208 but not sent between the two devices; a one-time-passcode exchanged between the transmitting device 204 and the receiving device 208; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 204 and the receiving device 208. In effect, this may create a one-time use key, such as a single-use session key.

Figure 3:
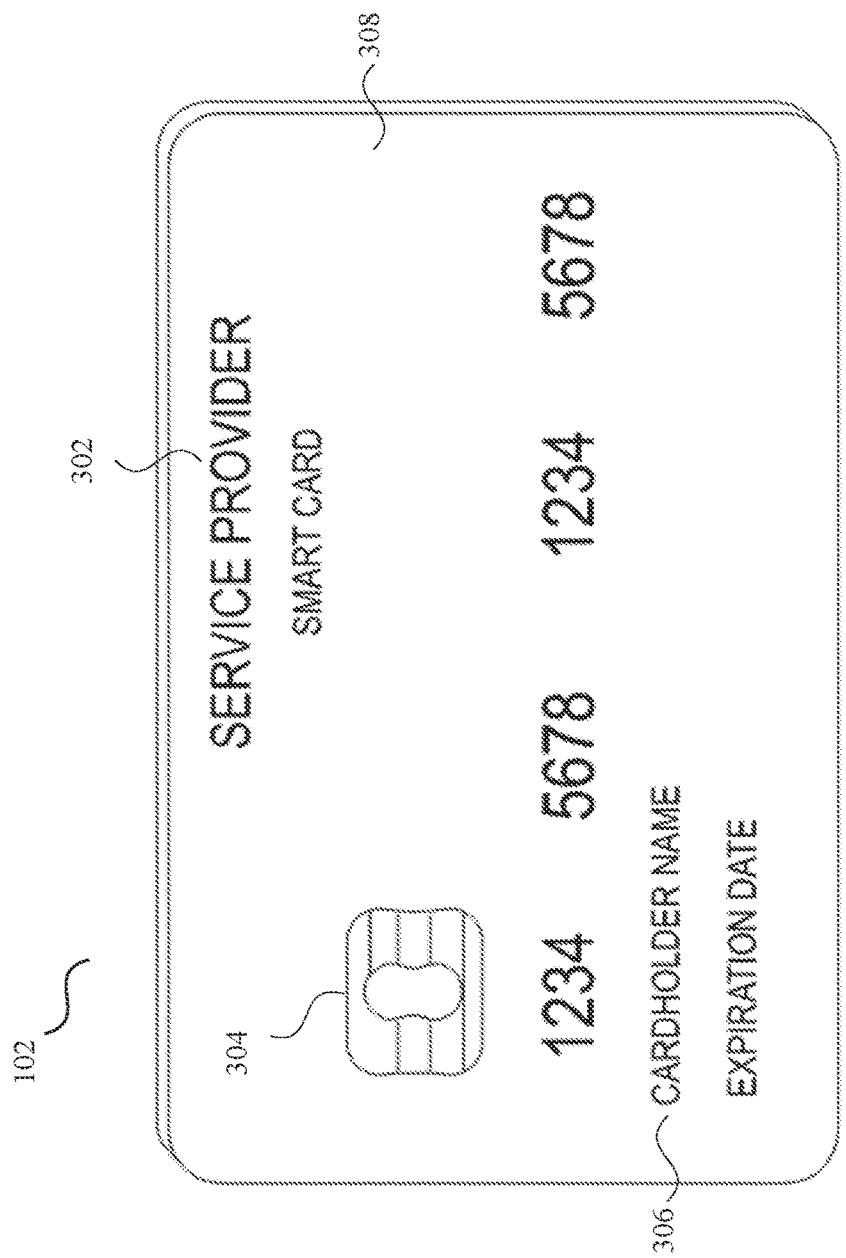
FIG. 3 illustrates a contactless card 102 in accordance with one embodiment.

FIG. 3 illustrates an example configuration of a contactless card 102, which may include a contactless card, a payment card, such as a credit card, debit card, or gift card, issued by a service provider as displayed as service provider indicia 302 on the front or back of the contactless card 102. In some examples, the contactless card 102 is not related to a payment card, and may include, without limitation, an identification card. In some examples, the transaction card may include a dual interface contactless payment card, a rewards card, and so forth. The contactless card 102 may include a substrate 308, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 102 may have physical characteristics compliant with the ID-1 format of the ISO/IEC 7816 standard, and the transaction card may otherwise be compliant with the ISO/IEC 14443 standard. However, it is understood that the contactless card 102 according to the present disclosure may have different characteristics, and the present disclosure does not require a transaction card to be implemented in a payment card.

Figure 4:
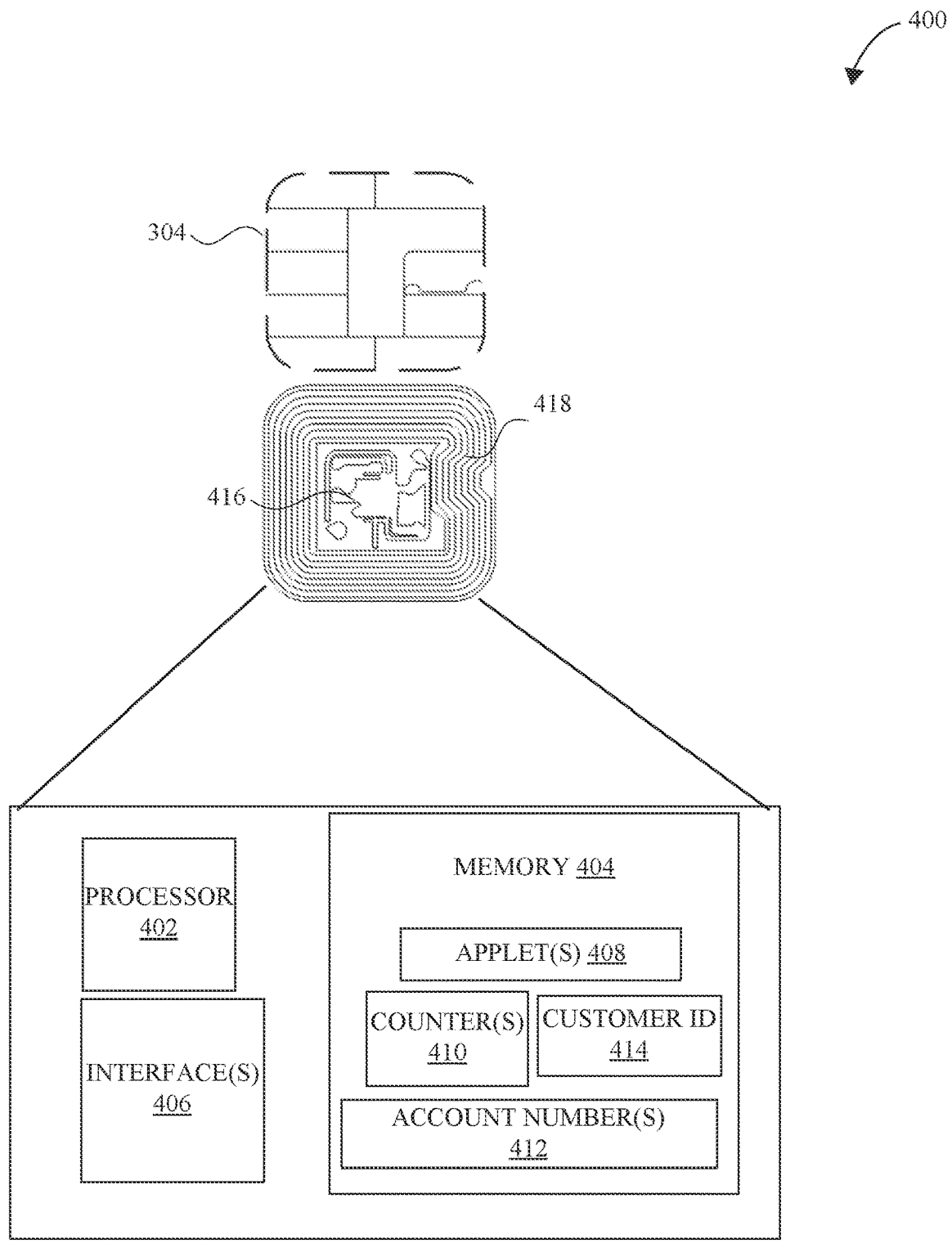
FIG. 4 illustrates a transaction card component 400 in accordance with one embodiment.

The contactless card 102 may also include identification information 306 displayed on the front and/or back of the card, and a contact pad 304. The contact pad 304 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 102 may also include processing circuitry, antenna and other components as will be further discussed in FIG. 4. These components may be located behind the contact pad 304 or elsewhere on the substrate 308, e.g. within a different layer of the substrate 308, and may electrically and physically coupled with the contact pad 304. The contactless card 102 may also include a magnetic strip or tape, which may be located on the back of the card (not shown in FIG. 3). The contactless card 102 may also include a Near-Field Communication (NFC) device coupled with an antenna capable of communicating via the NFC protocol. Embodiments are not limited in this manner.

As illustrated in FIG. 2, the contact pad 304 of contactless card 102 may include processing circuitry 416 for storing, processing, and communicating information, including a processor 402, a memory 404, and one or more interface(s) 406. It is understood that the processing circuitry 416 may contain additional components, including processors, memories, error and parity/CRC checkers, data encoders, anticollision algorithms, controllers, command decoders, security primitives and tamperproofing hardware, as necessary to perform the functions described herein.

The memory 404 may be a read-only memory, write-once read-multiple memory or read/write memory, e.g., RAM, ROM, and EEPROM, and the contactless card 102 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 404 may be encrypted memory utilizing an encryption algorithm executed by the processor 402 to encrypted data.

The memory 404 may be configured to store one or more applet(s) 408, one or more counter(s) 410, a customer identifier 414, and the account number(s) 412, which may be virtual account numbers. The one or more applet(s) 408 may comprise one or more software applications configured to execute on one or more contactless cards, such as a Java® Card applet. However, it is understood that applet(s) 408 are not limited to Java Card applets, and instead may be any software application operable on contactless cards or other devices having limited memory. The one or more counter(s) 410 may comprise a numeric counter sufficient to store an integer. The customer identifier 414 may comprise a unique alphanumeric identifier assigned to a user of the contactless card 102, and the identifier may distinguish the user of the contactless card from other contactless card users. In some examples, the customer identifier 414 may identify both a customer and an account assigned to that customer and may further identify the contactless card 102 associated with the customer's account. As stated, the account number(s) 412 may include thousands of one-time use virtual account numbers associated with the contactless card 102. An applet(s) 408 of the contactless card 102 may be configured to manage the account number(s) 412 (e.g., to select an account number(s) 412, mark the selected account number(s) 412 as used, and transmit the account number(s) 412 to a mobile device for autofilling by an autofilling service.

The processor 402 and memory elements of the foregoing exemplary embodiments are described with reference to the contact pad 304, but the present disclosure is not limited thereto. It is understood that these elements may be implemented outside of the contact pad 304 or entirely separate from it, or as further elements in addition to processor 402 and memory 404 elements located within the contact pad 304.

In some examples, the contactless card 102 may comprise one or more antenna(s) 418. The one or more antenna(s) 418 may be placed within the contactless card 102 and around the processing circuitry 416 of the contact pad 304. For example, the one or more antenna(s) 418 may be integral with the processing circuitry 416 and the one or more antenna(s) 418 may be used with an external booster coil. As another example, the one or more antenna(s) 418 may be external to the contact pad 304 and the processing circuitry 416.

In an embodiment, the coil of contactless card 102 may act as the secondary of an air core transformer. The terminal may communicate with the contactless card 102 by cutting power or amplitude modulation. The contactless card 102 may infer the data transmitted from the terminal using the gaps in the contactless card's power connection, which may be functionally maintained through one or more capacitors. The contactless card 102 may communicate back by switching a load on the contactless card's coil or load modulation. Load modulation may be detected in the terminal's coil through interference. More generally, using the antenna(s) 418, processor 402, and/or the memory 404, the contactless card 102 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet(s) 408 may be added to contactless cards to provide a one-time password (OTP) for multifactor authentication (MFA) in various mobile application-based use cases. Applet(s) 408 may be configured to respond to one or more requests, such as near field data exchange requests, from a reader, such as a mobile NFC reader (e.g., of a mobile device or point-of-sale terminal) and produce an NDEF message that comprises a cryptographically secure OTP encoded as an NDEF text tag.

One example of an NDEF OTP is an NDEF short-record layout (SR=1). In such an example, one or more applet(s) 408 may be configured to encode the OTP as an NDEF type 4 well known type text tag. In some examples, NDEF messages may comprise one or more records. The applet(s) 408 may be configured to add one or more static tag records in addition to the OTP record.

In some examples, the one or more applet(s) 408 may be configured to emulate an RFID tag. The RFID tag may include one or more polymorphic tags. In some examples, each time the tag is read, different cryptographic data is presented that may indicate the authenticity of the contactless card. Based on the one or more applet(s) 408, an NFC read of the tag may be processed, the data may be transmitted to a server, such as a server of a banking system, and the data may be validated at the server.

In some examples, the contactless card 102 and server may include certain data such that the card may be properly identified. The contactless card 102 may include one or more unique identifiers (not pictured). Each time a read operation takes place, the counter(s) 410 may be configured to increment. In some examples, each time data from the contactless card 102 is read (e.g., by a mobile device), the counter(s) 410 is transmitted to the server for validation and determines whether the counter(s) 410 are equal (as part of the validation) to a counter of the server.

The one or more counter(s) 410 may be configured to prevent a replay attack. For example, if a cryptogram has been obtained and replayed, that cryptogram is immediately rejected if the counter(s) 410 has been read or used or otherwise passed over. If the counter(s) 410 has not been used, it may be replayed. In some examples, the counter that is incremented on the card is different from the counter that is incremented for transactions. The contactless card 101 is unable to determine the application transaction counter(s) 410 since there is no communication between applet(s) 408 on the contactless card 102.

In some examples, the counter(s) 410 may get out of sync. In some examples, to account for accidental reads that initiate transactions, such as reading at an angle, the counter(s) 410 may increment but the application does not process the counter(s) 410. In some examples, when the client device 110 is woken up, NFC may be enabled and the client device 110 may be configured to read available tags, but no action is taken responsive to the reads.

To keep the counter(s) 410 in sync, an application, such as a background application, may be executed that would be configured to detect when the client device 110 wakes up and synchronize with the server of a banking system indicating that a read that occurred due to detection to then move the counter(s) 410 forward. In other examples, Hashed One Time Password may be utilized such that a window of mis-synchronization may be accepted. For example, if within a threshold of 10, the counter(s) 410 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 410 increases in the appropriate sequence, then it possible to know that the user has done so.

The key diversification technique described herein with reference to the counter(s) 410, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 102, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 102. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 102 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 5:
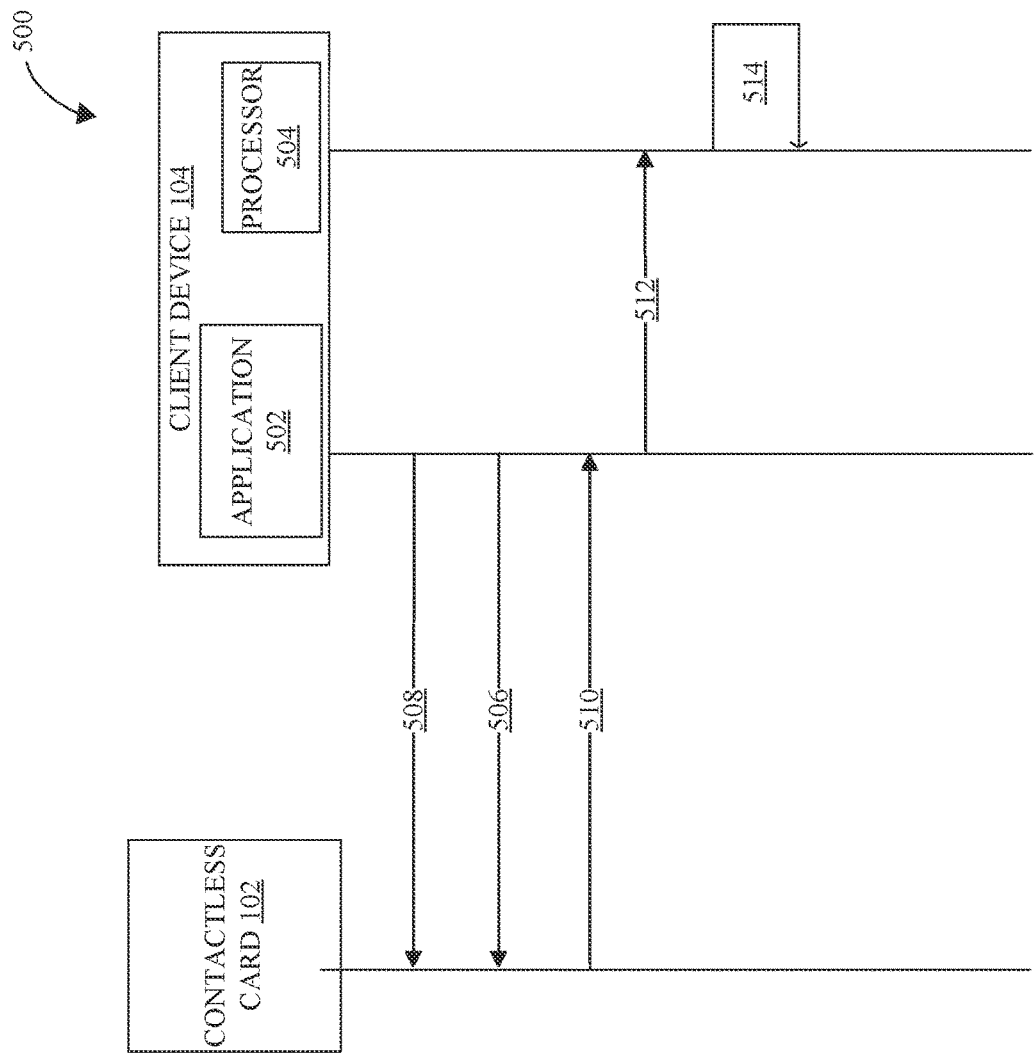
FIG. 5 illustrates a sequence flow 500 in accordance with one embodiment.

FIG. 5 is a timing diagram illustrating an example sequence for providing authenticated access according to one or more embodiments of the present disclosure. Sequence flow 500 may include contactless card 102 and client device 104, which may include an application 502 and processor 504.

At line 508, the application 502 communicates with the contactless card 102 (e.g., after being brought near the contactless card 102). Communication between the application 502 and the contactless card 102 may involve the contactless card 102 being sufficiently close to a card reader (not shown) of the client device 104 to enable NFC data transfer between the application 502 and the contactless card 102.

At line 506, after communication has been established between client device 104 and contactless card 102, contactless card 102 generates a message authentication code (MAC) cryptogram. In some examples, this may occur when the contactless card 102 is read by the application 502. In particular, this may occur upon a read, such as an NFC read, of a near field data exchange (NDEF) tag, which may be created in accordance with the NFC Data Exchange Format. For example, a reader application, such as application 502, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 102 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 502 may be configured to transmit a request to contactless card 102, the request comprising an instruction to generate a MAC cryptogram.

At line 510, the contactless card 102 sends the MAC cryptogram to the application 502. In some examples, the transmission of the MAC cryptogram occurs via NFC, however, the present disclosure is not limited thereto. In other examples, this communication may occur via Bluetooth, Wi-Fi, or other means of wireless data communication. At line 512, the application 502 communicates the MAC cryptogram to the processor 504.

At line 514, the processor 504 verifies the MAC cryptogram pursuant to an instruction from the application 122. For example, the MAC cryptogram may be verified, as explained below. In some examples, verifying the MAC cryptogram may be performed by a device other than client device 104, such as a server of a banking system in data communication with the client device 104. For example, processor 504 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 6:
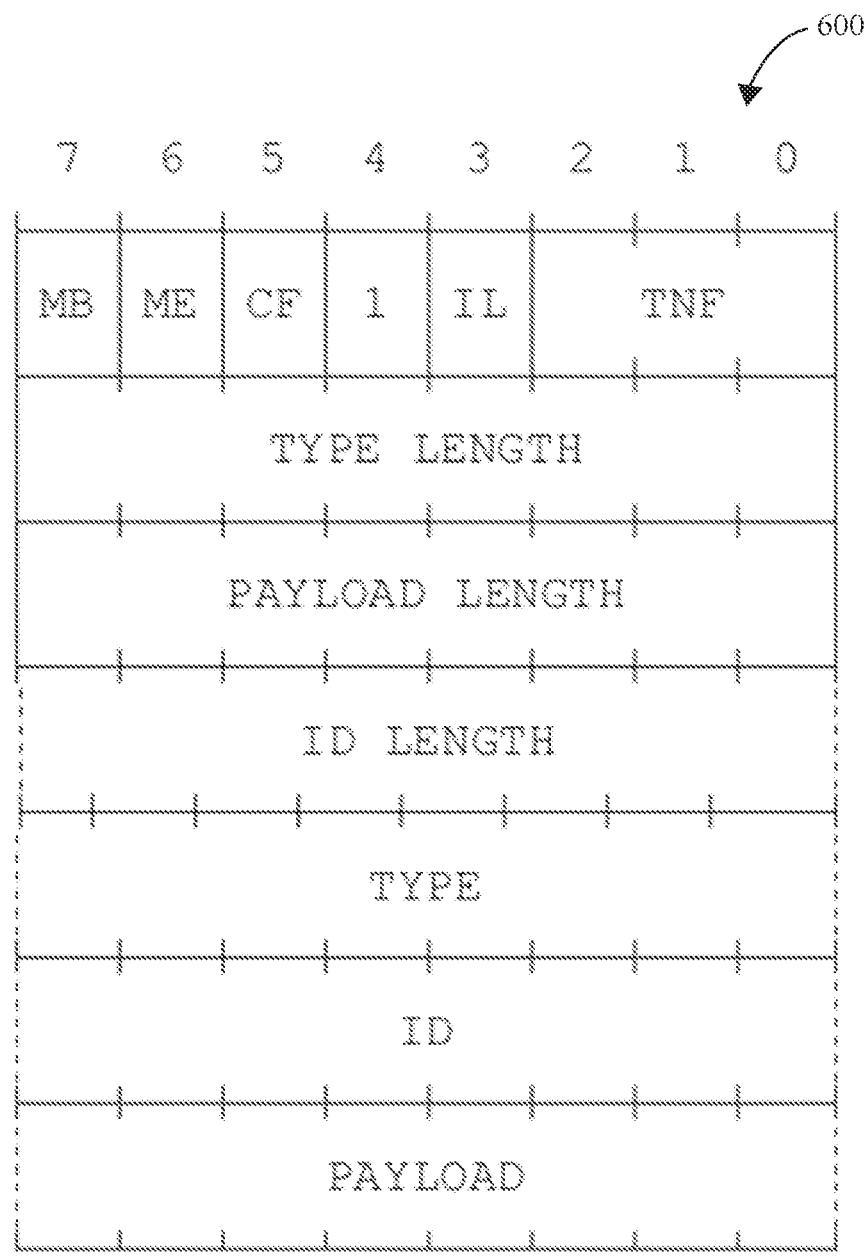
FIG. 6 illustrates a data structure 600 in accordance with one embodiment.

FIG. 6 illustrates an NDEF short-record layout (SR=1) data structure 600 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well-known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

Figure 7:
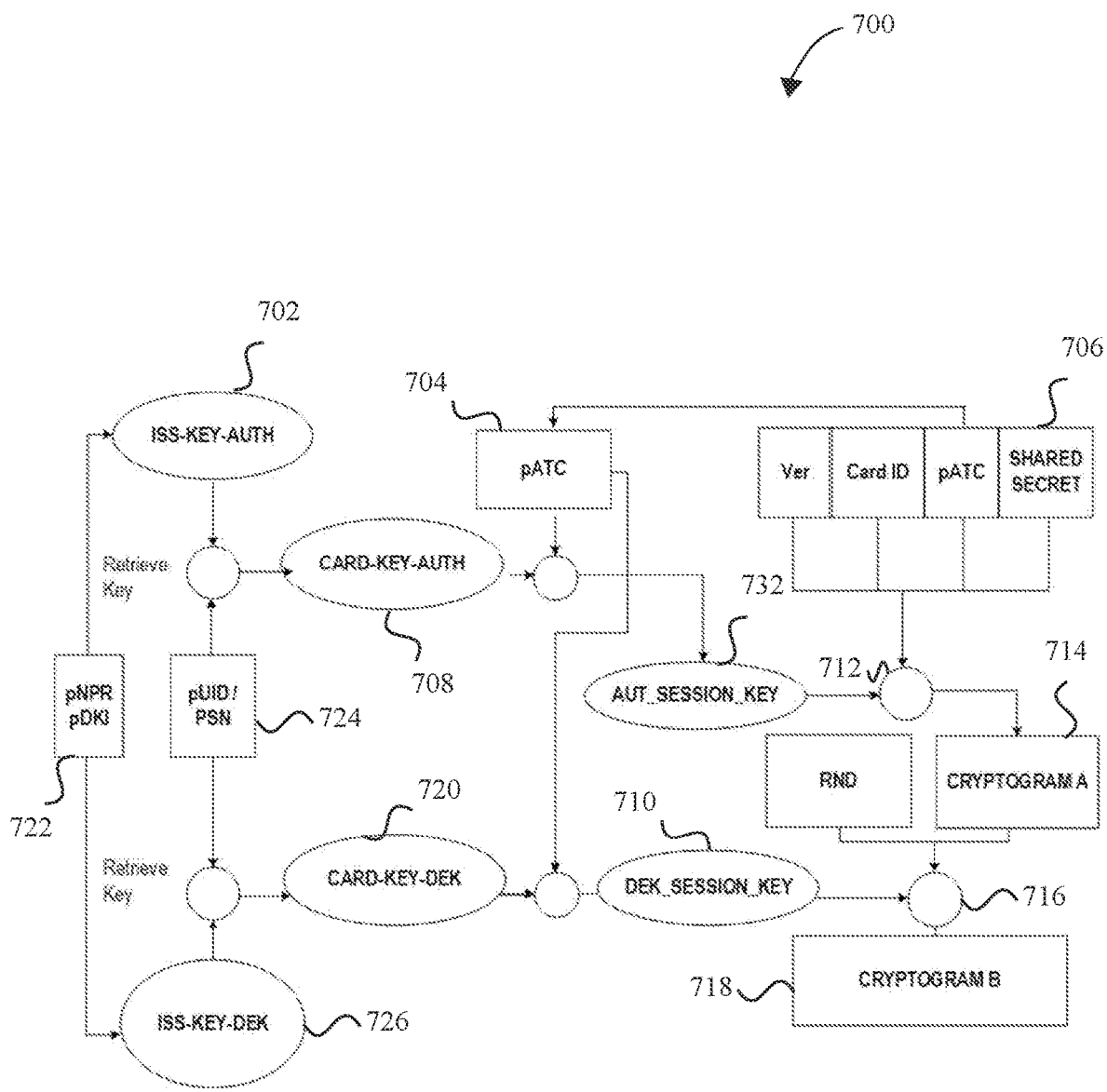
FIG. 7 is a diagram of a key system according to an example embodiment.

FIG. 7 illustrates a diagram of a system 700 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 702, 726 may be required for each part of the portfolio on which the one or more applets is issued. For example, the first master key 702 may comprise an Issuer Cryptogram Generation/Authentication Key (Iss-Key-Auth) and the second master key 726 may comprise an Issuer Data Encryption Key (Iss-Key-DEK). As further explained herein, two issuer master keys 702, 726 are diversified into card master keys 708, 720, which are unique for each card. In some examples, a network profile record ID (pNPR) 522 and derivation key index (pDKI) 724, as back office data, may be used to identify which Issuer Master Keys 702, 726 to use in the cryptographic processes for authentication. The system performing the authentication may be configured to retrieve values of pNPR 722 and pDKI 724 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 708 and Card-Key-Dek 720). The session keys (Aut-Session-Key 732 and DEK-Session-Key 710) may be generated by the one or more applets and derived by using the application transaction counter (pATC) 704 with one or more algorithms. To fit data into the one or more algorithms, only the 2 low order bytes of the 4-byte pATC 704 is used. In some examples, the four byte session key derivation method may comprise: F1:=PATC (lower 2 bytes)||'F0'||'00'||PATC (four bytes) F1:=PATC (lower 2 bytes)||'0F'||'00'||PATC (four bytes) SK:={(ALG (MK) [F1]||ALG (MK) [F2]}, where ALG may include 3DES ECB and MK may include the card unique derived master key.

As described herein, one or more MAC session keys may be derived using the lower two bytes of pATC 704 counter. At each tap of the contactless card, pATC 704 is configured to be updated, and the card master keys Card-Key-AUTH 508 and Card-Key-DEK 720 are further diversified into the session keys Aut-Session-Key 732 and DEK-Session-KEY 710. pATC 704 may be initialized to zero at personalization or applet initialization time. In some examples, the pATC counter 704 may be initialized at or before personalization and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 732. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 732, as explained above. As explained above, the low order two bytes of the counter may be used to diversify for the one or more MAC session keys. As explained below, AUT-Session-Key 732 may be used to MAC data 706, and the resulting data or cryptogram A 714 and random number RND may be encrypted using DEK-Session-Key 710 to create cryptogram B or output 718 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 710 derived from the Card-Key-DEK 720. In this case, the ATC value for the session key derivation is the least significant byte of the counter pATC 704.

The format below represents a binary version example embodiment. Further, in some examples, the first byte may be set to ASCII 'A'.

| Message Format 1 | | | | |
|---|---|---|---|---|
| | 2 | 4 | 8 | 8 |
| 0x43 (Message Type 'A') | Version | pATC | RND | Cryptogram A (MAC) |
| Cryptogram A (MAC) MAC of | 8 bytes | | | |
| 2 | 8 | 4 | 4 | 18 bytes input data |
| Version | | pUID | pATC | Shared Secret |

| Message Format 1 | | | |
|---|---|---|---|
| | 2 | 4 | 16 |
| 0x43 (Message Type 'A') | Version | pATC | Cryptogram B |
| Cryptogram A (MAC) MAC of | 8 bytes | | |
| 2 | 8 | 4 | 4 | 18 bytes input data |
| Version | pUID | pATC | Shared Secret | |
| Cryptogram B Sym Encryption of | 16 | | |
| 8 | 8 | | |
| RND | Cryptogram A | | |

Another exemplary format is shown below. In this example, the tag may be encoded in hexadecimal format.

| Message Format 2 | | | | |
|---|---|---|---|---|
| Version | 8 | 4 | 8 | 8 |
| | pUID | pATC | RND | Cryptogram A (MAC) |
| 8 bytes | | | | |
| 8 | 8 | 4 | 4 | 18 bytes input data |
| pUID | pUID | pATC | Shared Secret | |

| Message Format 2 | | | |
|---|---|---|---|
| Version | 8 | 4 | 16 |
| | pUID | pATC | Cryptogram B |
| 8 bytes | | | |
| 8 | | 4 | 4 | 18 bytes input data |
| pUID | pUID | pATC | Shared Secret |
| Cryptogram B Sym Encryption of | 16 | | |
| 8 | 8 | | |
| RND | Cryptogram A | | |

The UID field of the received message may be extracted to derive, from master keys Iss-Key-AUTH 502 and Iss-Key-DEK 726, the card master keys (Card-Key-Auth 708 and Card-Key-DEK 720) for that particular card. Using the card master keys (Card-Key-Auth 508 and Card-Key-DEK 720), the counter (pATC) field of the received message may be used to derive the session keys (Aut-Session-Key 732 and DEK-Session-Key 710) for that particular card. Cryptogram B 718 may be decrypted using the DEK-Session-KEY, which yields cryptogram A 714 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 714, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 732. The input data 706 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 712, data 706 is processed through the MAC using Aut-Session-Key 732 to produce MAC output (cryptogram A) 714, which is encrypted.

In order to provide additional protection against brute force attacks exposing the keys on the card, it is desirable that the MAC cryptogram 714 be enciphered. In some examples, data or cryptogram A 714 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 710. In the encryption operation 716, data or cryptogram A 714 and RND are processed using DEK-Session-Key 510 to produce encrypted data, cryptogram B 718. The data 714 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

Figure 8:
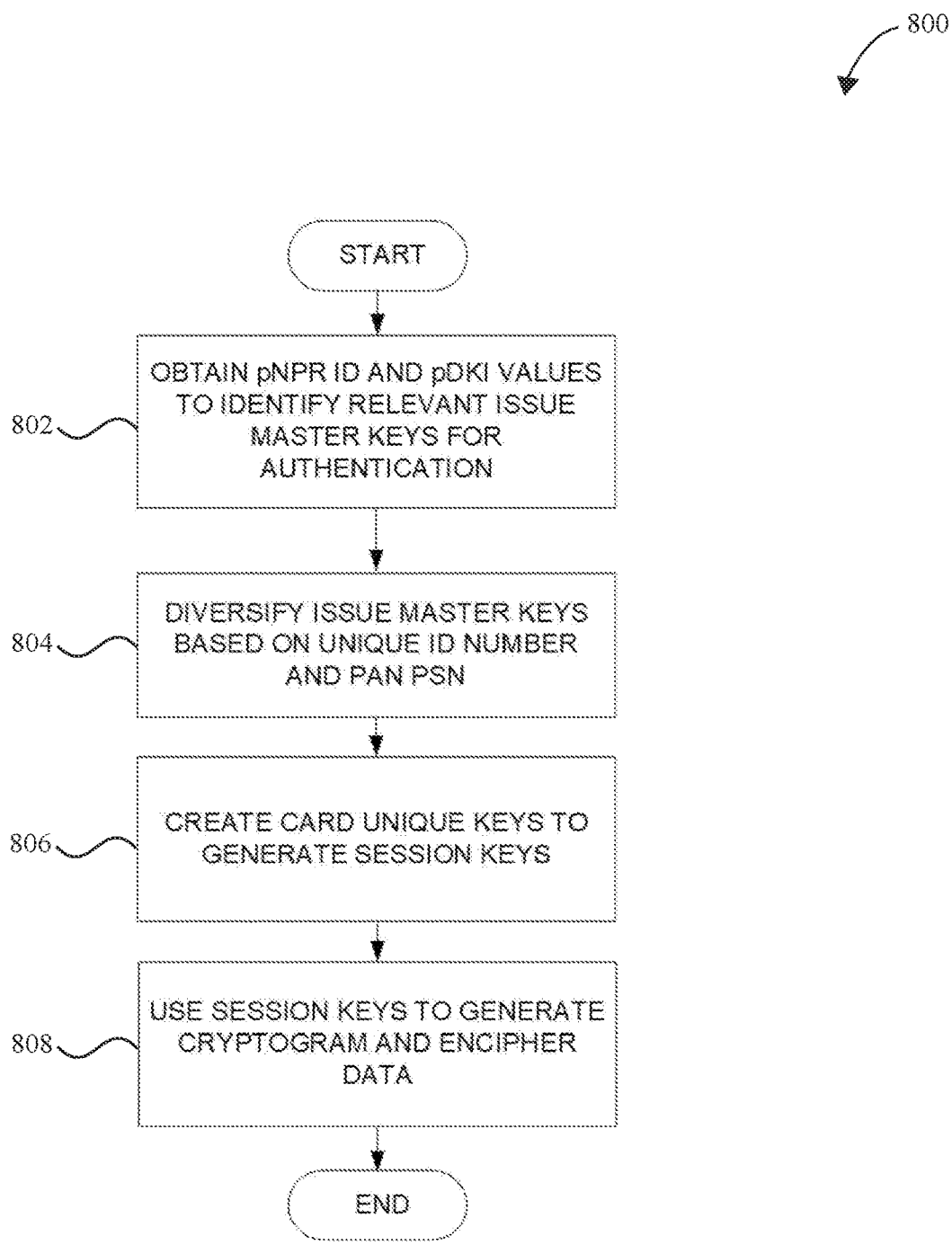
FIG. 8 is a flowchart of a method of generating a cryptogram according to an example embodiment.

FIG. 8 illustrates a method 800 for generating a cryptogram. For example, at block 802, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 804, Issuer Master Keys may be diversified by combining them with the card's unique ID number (pUID) and the PAN sequence number (PSN) of one or more applets, for example, a payment applet.

At block 806, Card-Key-Auth and Card-Key-DEK (unique card keys) may be created by diversifying the Issuer Master Keys to generate session keys which may be used to generate a MAC cryptogram.

At block 808, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 9:
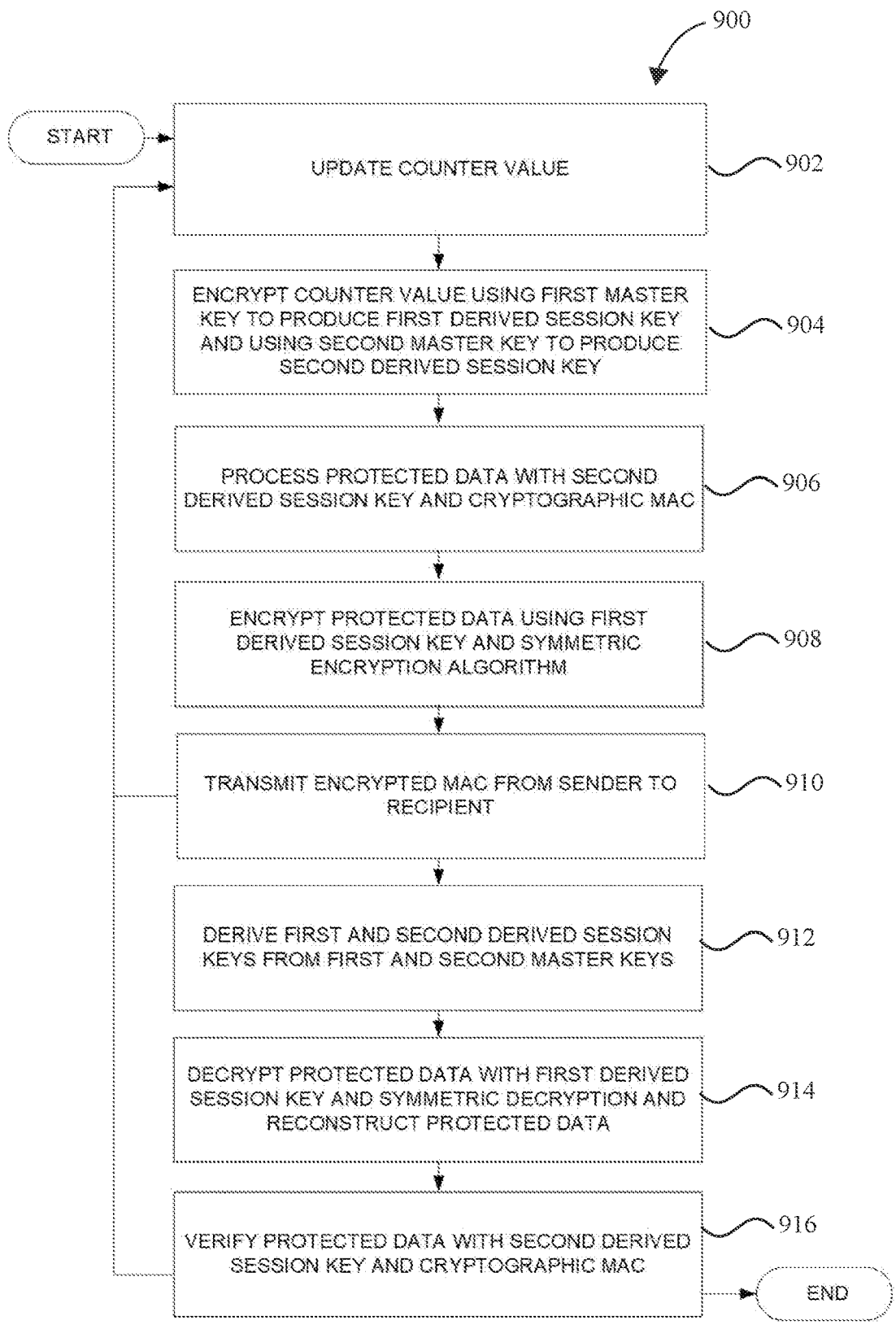
FIG. 9 illustrates an aspect of the subject matter in accordance with one embodiment.

FIG. 9 depicts an exemplary process 900 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 902, and other data, such as data to be protected, which it may secure share with the recipient.

At block 904, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 906, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 908, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 910, the encrypted MAC is transmitted, from the sender to the recipient, with sufficient information to identify additional secret information (such as shared secret, master keys, etc.), for verification of the cryptogram.

At block 912, the recipient uses the received counter value to independently derive the two derived session keys from the two master keys as explained above.

At block 914, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 916, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 902) and a new set of session keys may be created (at block 910). In some examples, the combined random data may be discarded.

Figure 10:
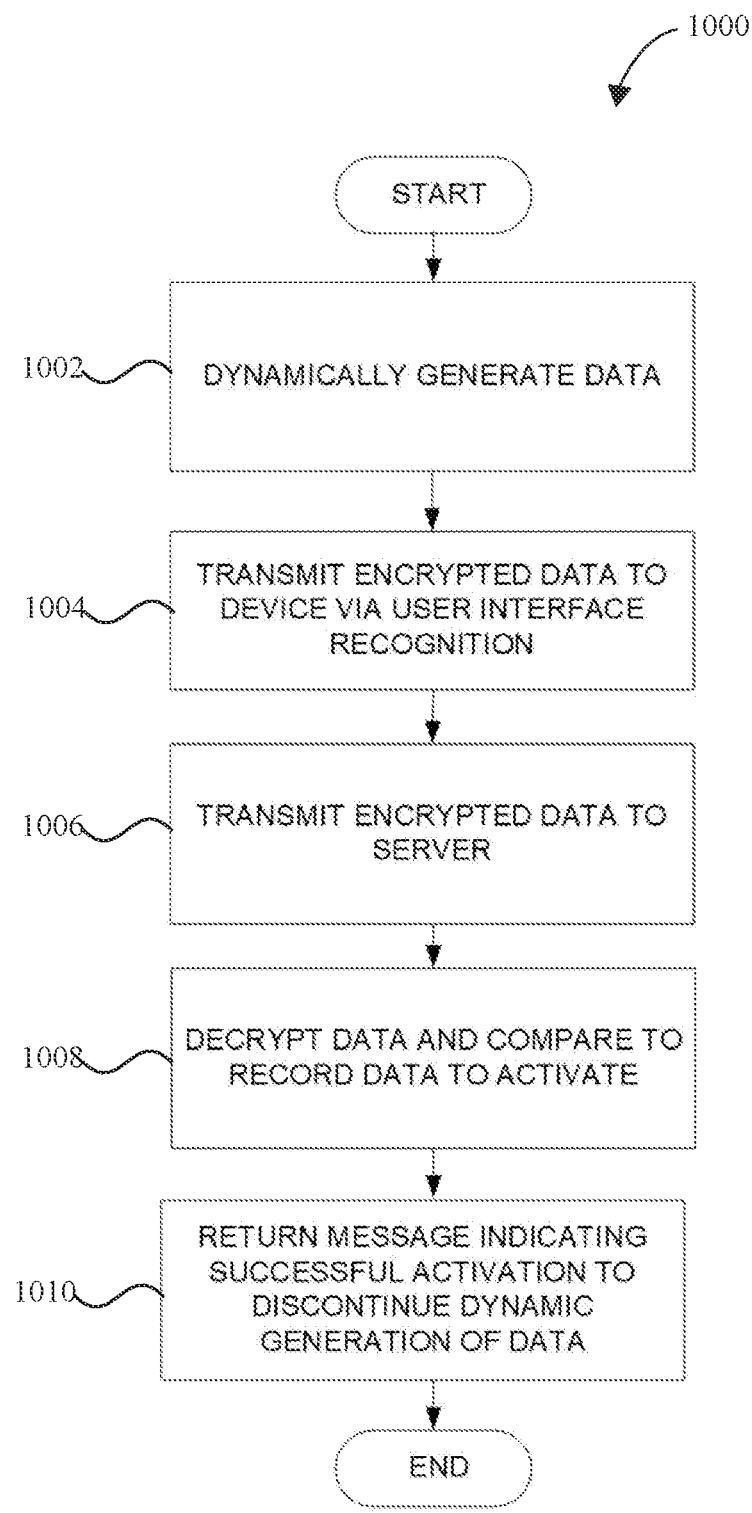
FIG. 10 illustrates an aspect of the subject matter in accordance with one embodiment.

FIG. 10 illustrates a method 1000 for card activation according to an example embodiment. For example, card activation may be completed by a system including a card, a device, and one or more servers. The contactless card, device, and one or more servers may reference same or similar components that were previously explained, such as contactless card 102, client device 104, and a server.

In block 1002, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1004, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1006, the one or more portions of the data may be communicated to one or more servers, such as a card issuer server. For example, one or more encrypted portions of the data may be transmitted from the device to the card issuer server for activation of the card.

In block 1008, the one or more servers may decrypt the one or more encrypted portions of the data via the systems and methods disclosed herein. For example, the one or more servers may receive the encrypted data from the device and may decrypt it to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1010, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

Figure 11:
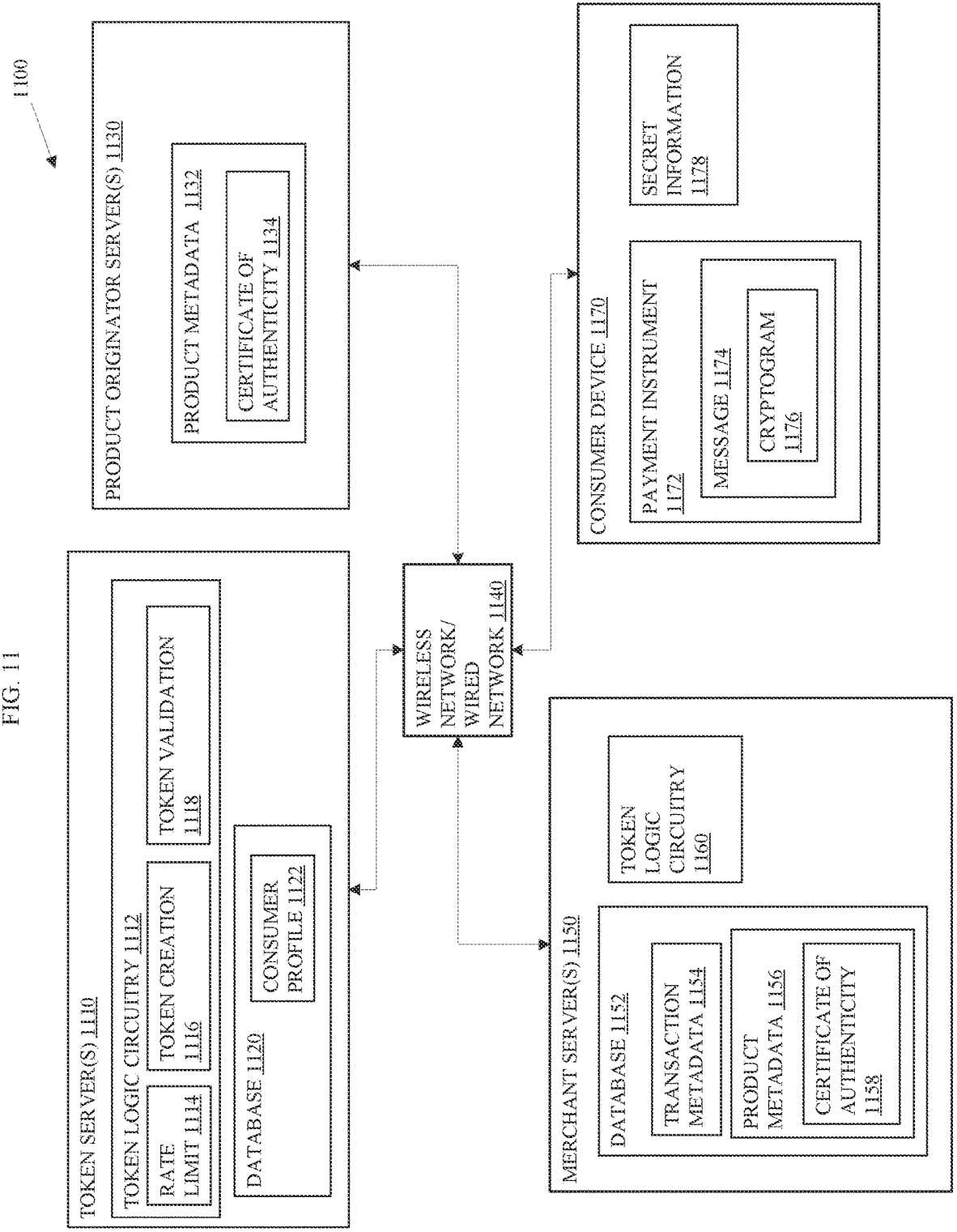
FIG. 11 depicts an embodiment of a system including servers, networks, data servers, and software applications for rate limitation, token creation, and token validation.

FIG. 11 depicts an embodiment of a system 1100 including servers, networks, data servers, and software applications for rate limitation, token creation and token validation. The system 1100 may represent a portion of at least one wireless or wired network 1140 that interconnects token server(s) 1110 with product originator server(s) 1130, merchant server(s) 1150, and a consumer device 1170. The at least one wireless or wired network 1140 may represent any type of network or communications medium that can interconnect the token server(s) 1110 and the merchant server(s) 1150, such as a cellular service, a cellular data service, satellite service, other wireless communication networks, fiber optic services, other land-based services, and/or the like, along with supporting equipment such as hubs, routers, switches, amplifiers, and/or the like.

In the present embodiment, the token server(s) 1110 may represent one or more servers owned and/or operated by a company that provides services. In some embodiments, the token server(s) 1110 represent more than one company that provides services provided via token logic circuitry 1112. For example, a first set of one or more token server(s) 1110 may provide services including a rate limitation 1114 service and token creation 1116 service. The rate limitation 1114 and token creation 1116 services may involve a determination if the consumer or the payment instrument 1172 is eligible to process a transaction for the purchase of a special edition product and generation of a product token for authentication of the special edition product after the purchase of the product.

The rate limit 1114 service of the token logic circuitry 1112 may receive a message 1174 including an applet version, a unique identifier, an application transaction counter value, and a cryptogram 1176 from the consumer device directly or via the merchant server(s) 1150 associated with transaction metadata 1154. The transaction metadata may include a merchant identifier, a product identifier, a purchase price, and/or the like. The rate limit service 1114 may access the consumer profile 1122 in a database 1120 of the token server(s) 1110 to determine information about the consumer's purchase history in relation to the rate limited product. Based on the information, the rate limit 1114 service may determine the number of purchases made by the consumer (or by the payment instrument of the consumer depending on whether the rate limit applies to the consumer or the payment instrument or both) of the product subject to the rate limit. If the rate limit is less than the number of purchases made by the consumer (or the payment instrument), the rate limit 1114 service may approve the transaction for processing. However, if the rate limit is equal to or greater than the number of purchases made by the consumer (or the payment instrument), the rate limit 1114 service may disapprove the transaction for further processing.

A second set of one or more token server(s) 1110 may include a token creation 1116 service to generate a product token to validate the authenticity of the product. The token creation 1116 service of the token logic circuitry 1112 may receive transaction metadata from the merchant to identify the merchant as well as the transaction. The token creation 1116 service of the token logic circuitry 1112 may also receive product metadata 1156 from the database 1152 in the merchant server(s) 1150 and/or product metadata 1132 from the product originator server(s) 1130. The product metadata 1132 and/or 1156 may identify information about the product to identify the product and, in many embodiments, uniquely identify the product. In some embodiments, the merchant and/or the product originator may provide a certificate of authenticity 1158 and 1134, respectively, to attest to authenticity and/or uniquely describe product. For example, the transaction metadata may include a transaction identifier, a price, or a combination thereof. The product metadata may include a size, a model number, a serial number, a picture of the product, one or more certificates of authenticity, or a combination thereof. In many embodiments, the one or more certificates of authenticity may include data in a digital format that describes the product and attests to the authenticity of the product.

The token creation 1116 service may generate the product token by hashing the metadata, determining a key for encryption, and, in some embodiments, obtaining secret information 1178 from the consumer. In some embodiments, the token creation 1116 service may use the cryptogram 1176 from the consumer device 1170 combined with a hash of the metadata and the secret information 1178 as the key. In other embodiments, the token creation 1116 service may use the cryptogram 1176 from the consumer device 1170 combined with a hash of the metadata as the key. In other embodiments, the token creation 1116 service may use a session key that created the cryptogram 1176 from the consumer device 1170 combined with a hash of the metadata as the key. In other embodiments, the token creation 1116 service may use another diversified key associated with the consumer device 1170 combined with a hash of the metadata as the key. In many embodiments, the key may be a MAC and, in other embodiments, the key may comprise one key of a pair of asymmetric keys such as a public key or a private key of a public/private key pair.

The token creation 1116 service may generate the product token with the hash combined with the key, a unique identifier for a payment instrument associated with payment for the transaction, an application transaction counter associated with the payment instrument, and a merchant identifier. In some embodiments, the product token may generate the product token with the hash combined with the MAC, a unique identifier for a payment instrument associated with payment for the transaction, an application transaction counter associated with the payment instrument, and a merchant identifier.

A third set of one or more server(s) 1010 may include a token validation 1118 service of the token logic circuitry 1112 to authenticate a product token for a product. The token validation 1118 service may receive the product token from a consumer or a subsequent purchaser that is purchasing the product from the consumer. The token validation 1118 service may receive a message 1174 containing the cryptogram 1176 from the transaction and the transaction metadata and product metadata associated with the product token. In some embodiments, the token validation 1118 service may also determine or receive the secret information 1178 provided by the consumer to the token creation 1114 service at the creation of the product token.

Based on the unique identifier and application transaction counter in the message 1174 with the cryptogram 1176 and a hash of the metadata, the token validation 1118 service may decrypt the product token to authenticate the product token. In some embodiments, the token validation 1118 service may also use the secret information 1178 with the unique identifier and application transaction counter in the message 1174 with the cryptogram 1176 and a hash of the metadata to decrypt the product token. For example, the token validation 1118 service may determine a key such as a MAC to decrypt the product token based on a combination of a hash of the metadata, a key based on the cryptogram 1176, and the secret information 1178. In some embodiments, the "combination" refers to combination with an encryption algorithm such as some of the encryption algorithms described herein or other encryption algorithms.

After performing the decryption of the product token, the token validation 1118 service may verify that the transaction metadata and product metadata associated with the product token match metadata within the product token to authenticate the product token. In some embodiments, the token validation 1118 service may cause transmission of authentication of the product token to the requestor. In other words, the token validation 1118 service may confirm whether or not the product token is authenticated to the requestor. The requestor may be the consumer or another person or entity that requested authentication of product token.

In some embodiments, the token logic circuitry 1160 may perform one or more of the services of the token logic circuitry 1112 such as the rate limit 1114 service, the token creation 1116 service, and/or the token validation 1118 service. In some embodiments, the token logic circuitry 1160 of the merchant server(s) 1150 may partially perform one or more of the services and the token logic circuitry 1112 may perform the remaining portions of the services. In other embodiments, the product originator server(s) 1130 may include token logic circuitry such as the token logic circuitry 1112 and/or 1160.

Figure 12:
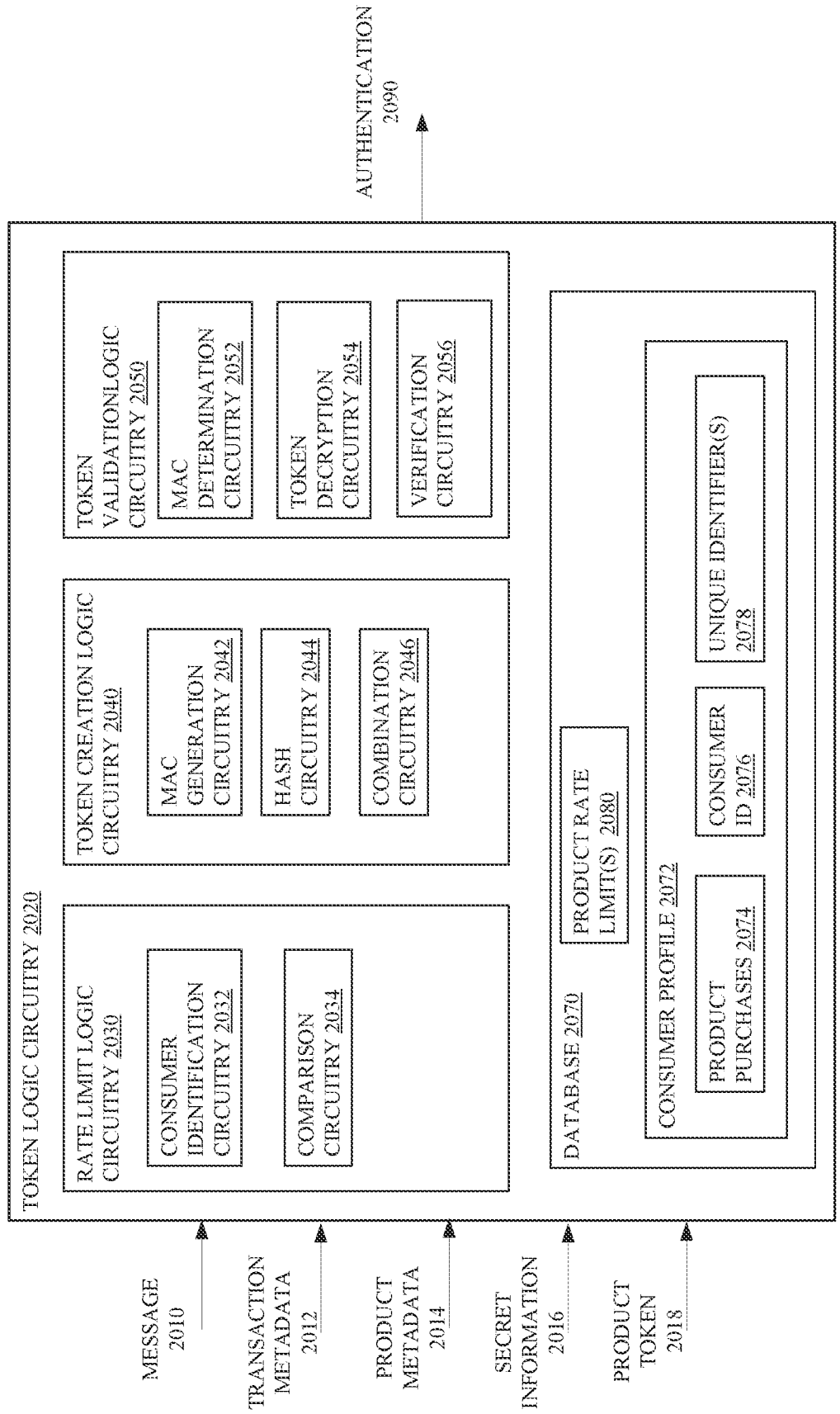
FIG. 12 depicts an embodiment of logic circuitry for rate limitation, token creation and token validation, such as the token logic circuitry illustrated in FIG. 11.

FIG. 12 depicts an embodiment of a system 2000 comprising token logic circuitry 2020 for rate limitation, token creation and token validation, such as the token logic circuitry illustrated in FIG. 11. The token logic circuitry 2020 may comprise a rate limit logic circuitry 2030, a token creation logic circuitry 2040, a token validation logic circuitry 2050, and a database 2070. The rate limit logic circuitry 2030 may receive a request for approval for a transaction for a product and approve the transaction if a per consumer and/or per payment instrument, purchase rate limit of the product has not been reached or exceeded. The rate limit logic circuitry 2030 may comprise a consumer identification logic circuitry 2032 and a comparison logic circuitry 2034.

The consumer identification logic circuitry 2032 may receive a message 2010 from the consumer associated with the transaction comprising an applet version, a unique identifier, an application transaction counter value, and a cryptogram. In some embodiments, the transaction metadata 2012 may comprise a payment instrument identifier for the transaction to purchase the product.

The consumer identification logic circuitry 2032 may identify or locate a consumer in a consumer profile 2072 of a database 2070 based on the unique identifier in the message 2010 and the unique identifier(s) 2078 in the consumer profile 2072. The consumer identification logic circuitry 2032 may find and retrieve a product count from product purchases 2074 associated with a consumer identifier 2076 that uniquely identifies the consumer, a purchase count from the product purchases 2074 associated with the unique identifier, or both in the consumer profile 2072. The rate limit logic circuitry 2030 may locate and retrieve the rate limit(s) 2080 for the product based on product information in the product metadata 2014 and the comparison logic circuitry 2034 may compare the rate limit(s) 2080 for the product against the purchase count(s) of the product associated with the consumer and/or the unique identifier of the payment instrument.

Based on the comparison, the rate limit logic circuitry 2030 may determine to approve the transaction by the consumer to purchase the product with the payment instrument if the rate limit(s) do not equal or exceed the product rate limit(s) 2080 established for the product. If the rate limit(s) do equal or exceed the product rate limit(s) 2080 established for the product, the rate limit logic circuitry 2030 may disapprove the transaction.

The token creation logic circuitry 2040 may create a product token based on the message 2010, the transaction metadata 2012, the product metadata 2014, and, in some embodiments, secret information 2016 provided by the consumer. The token creation logic circuitry 2040 may comprise a MAC generation circuitry 2042, a hash generation circuitry 2044, and a combination circuitry 2046. The MAC generation circuitry 2042 may generate a MAC to encrypt a product token. The MAC may comprise a combination, via the combination logic circuitry 2046, of a hash of the transaction metadata and the product metadata by the hash circuitry 2044, a key based on the cryptogram, and, in some embodiments, the secret information. For instance, the key from the cryptogram may comprise the cryptogram or may comprise a session key or other diversified key of the payment instrument associated with the transaction. In many embodiments, the token creation logic circuitry 2040 may generate diversified keys associated with the transaction based on the unique identifier and the application transaction counter value from the message 2010.

The token validation circuitry 2050 may validate a product token provided to the token logic circuitry 2020 for a past purchase by a requestor. The requestor may be the consumer that purchased the product associated with the product token, a merchant that intends to offer the product for sale, and/or a new consumer that may be purchasing the product.

The token validation circuitry 2050 may receive the product token 2018 and receive or find a message 2010 with the cryptogram from the consumer profile for the original transaction associated with the product token. The token validation circuitry 2050 may receive transaction metadata and product metadata associated with the product token from the original consumer or the merchant and determine the secret information from the original consumer or the merchant.

After determining the metadata and information associated with the product token, a MAC determination circuitry 2052 may determine a MAC or other key based on the cryptogram in the message 2010 to decrypt the product token and the token decryption circuitry 2054 may decrypt the product token via the key. Thereafter, the verification circuitry 2056 of the token validation logic circuitry 2050 may verify that the transaction metadata 2012 and product metadata 2014 associated with the product token 2018. In particular, the verification circuitry 2056 may match metadata 2012 and/or 2014 against metadata within the product token 2018 based on decryption of the product token 2018 to authenticate the product token 2018. Once the product token is validated or authenticated, the token validation circuitry 2050 may cause transmission of authentication 2090 of the product token to requestor.

The token logic circuitry 2020 may transmit an indication of authorization 2090 for the transaction as well as a product token for the transaction if the rate limit logic circuitry 2030 approves the transaction for the product. On the other hand, the rate limit logic circuitry 2030 may disapprove the transaction in response to a determination that the consumer and/or the payment instrument used by the consumer has reached by the rate limit(s) 2080 for purchases of the product.

Figure 13A:
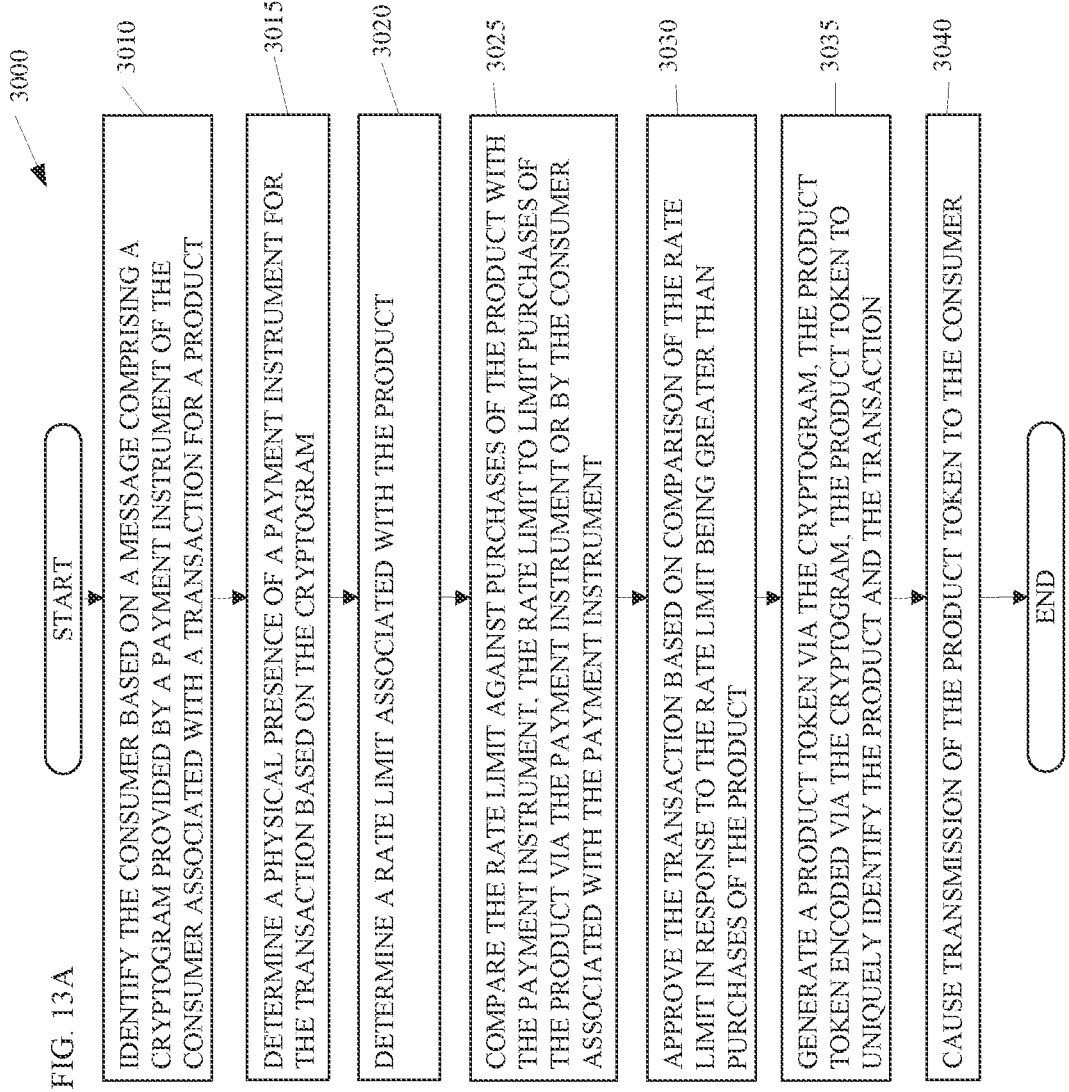
Figure 13B:
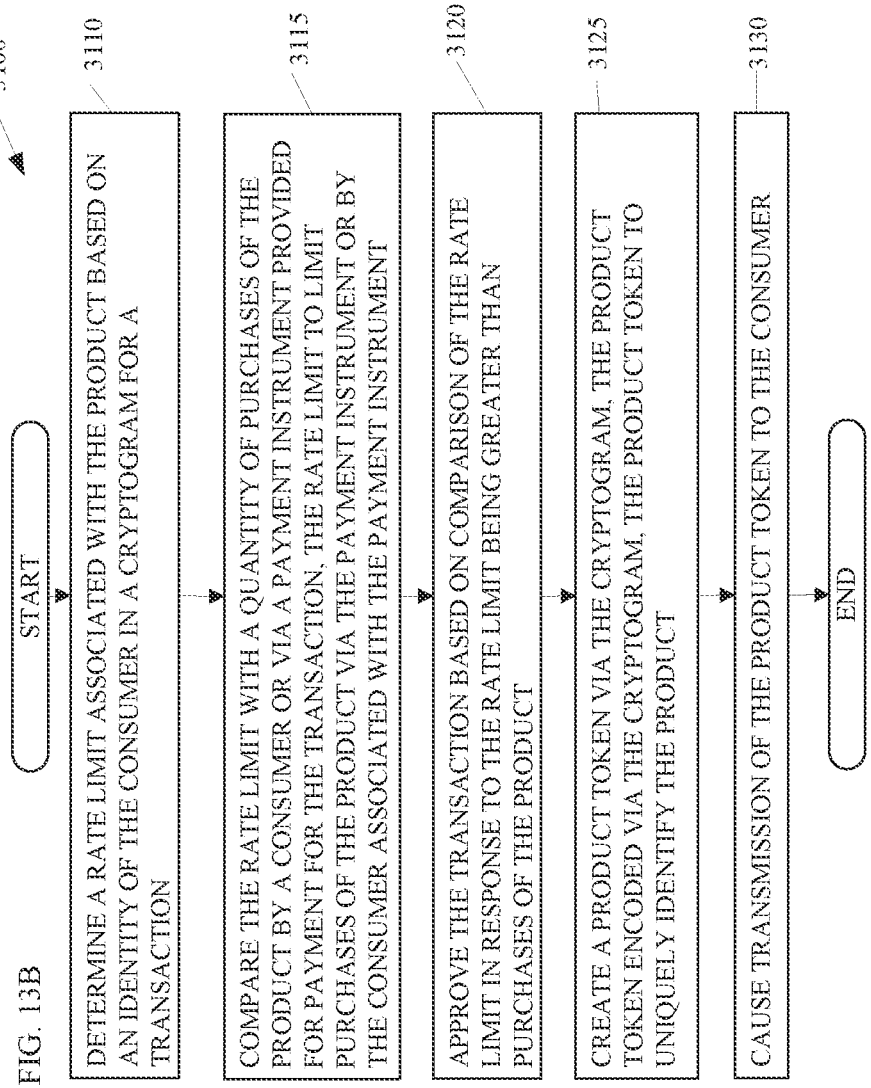

FIGS. 13A-C depict flowcharts of embodiments for rate limitation, token creation and token validation, by token logic circuitry, such as the token logic circuitry shown in FIGS. 11 and 12 via devices and servers and payment instruments (or contactless cards) discussed and shown in conjunction with FIGS. 1-12. FIG. 13A illustrates a flowchart 3000 for rate limitation and token creation for a transaction by a consumer to purchase a product such as a limited-edition product. The flowchart 3000 starts with identifying the consumer based on a message comprising a cryptogram provided by a payment instrument of the consumer via a transaction for a product (element 3010). For instance, the message may comprise an applet version associated with the payment instrument that created the cryptogram, the unique identifier for the payment instrument, and an application transaction counter value associated with the applet of the payment instrument.

The token logic circuitry may determine a physical presence of a payment instrument for the transaction based on the cryptogram (element 3015). For instance, in some embodiments, the token logic circuitry may verify the presence of the payment instrument based on the provision of the message with the cryptogram and, in some embodiments, verification of the content of the cryptogram. In some embodiments, a wallet applet for a smart phone or other client device may be capable of verification of the presence of the payment instrument by a tap to increment the transaction counter(s) of the payment instrument or because the payment instrument is, e.g., embodied in the applet on the smart phone or other client device.

After verification of the presence of the payment instrument, the token logic circuitry may determine a rate limit associated with the product (element 3020). In some embodiments, the token logic circuitry may access a database containing or request information from a database comprising product rate limits. The product rate limits may include product metadata to associate the product rate limits with the products and the token logic circuitry may receive or determine that rate limits for the product based on product metadata provided with other information about the transaction. In some embodiments, the rate limits for the products may relate to limits for the specific payment instrument being used to process the transaction. In some embodiments, the rate limits for the products may relate to limits for the consumer associated with the payment instrument being used to process the transaction. And, in some embodiments, the rate limits for the product may include a first rate limit for a payment instrument and a second rate limit that applies to the consumer. For example, each payment instrument may have a unique rate limit or each of the payment instruments may each have a rate limit, which may allow the consumer to purchase a quantity of the products equal to the total of the combined rate limits of the payment instruments associated with the consumer. Some embodiments may also set a rate limit on the consumer that sets a maximum quantity of products regardless of the number of payment instruments associated with the consumer.

After determining the rate limit(s) for the consumer and/or the payment instrument, the token logic circuitry may compare the rate limit against purchases of the product with the payment instrument, the rate limit to limit purchases of the product via the payment instrument and/or by the consumer associated with the payment instrument (element 3025). In some embodiments, the token logic circuitry may approve the transaction based on comparison of the rate limit in response to the rate limit being greater than purchases of the product (element 3030). In other embodiments, the token logic circuitry may disapprove the transaction based on comparison of the rate limit in response to the rate limit being equal to or less than purchases of the product by the consumer or payment instrument.

Once the token logic circuitry determines that the consumer is eligible to purchase the product with the transaction, the token logic circuitry may generate a product token via the cryptogram (element 3035). The token logic circuitry may encode product token via the cryptogram and the product token may uniquely identify the product and the transaction.

Once the token logic circuitry creates the product token, the token logic circuitry may cause transmission of the product token to the consumer (element 3040). The token logic circuitry may electronically transmit the product token directly to the consumer or indirectly to the consumer via the merchant and/or may mail a physical product token directly to the consumer or indirectly to the consumer via the merchant.

In some embodiments, the token logic circuitry may further determine secret information associated with the payment instrument and generate a MAC based on the secret information as a key for encryption of the product token. The token logic circuitry may obtain the secret information from the consumer directly and use the secret information in the creation of the MAC for encrypting the product token. In many embodiments, the token logic circuitry may only use the secret information for creation of the MAC and may exclude the secret information from the metadata encrypted and/or encoded in the product token.

In some embodiments, the token logic circuitry may receive product metadata associated with the transaction and hash the product metadata, wherein the product token comprises a hash of the product metadata. The product metadata may comprise information associated with the product, such as a size, a model number, a serial number, a picture of the product, a certificate of authenticity, or a combination thereof.

In some embodiments, the token logic circuitry may receive transaction metadata associated with the transaction and hash the transaction metadata, wherein the product token comprises a hash of the transaction metadata. The transaction metadata may comprise information associated with the transaction, such as a merchant identifier, a transaction identifier, a price, or a combination thereof.

In further embodiments, the token logic circuitry may authenticate the product token. In such embodiments, the token logic circuitry may receive the product token, receive cryptogram from the transaction, receive transaction metadata and product metadata associated with the product token, and determine the secret information via contact with the consumer or an organization associated with the consumer or a prospective purchaser.

The token logic circuitry may then determine a MAC or other key to decrypt the product token and decrypt the product token via the cryptogram. For instance, the cryptogram may be combined with the secret information to generate a key to decrypt the product token. In other embodiments, the token logic circuitry may determine another diversified key associated with the transaction to decrypt the product token such as a session key for the transaction.

After decrypting the product token, the token logic circuitry may verify that the transaction metadata and product metadata associated with the product token match metadata within the product token to authenticate the product token. Once the product token is authenticated, the token logic circuitry may cause transmission of authentication of the product token to requestor.

FIG. 13B illustrates a flowchart 3100 to rate limit sales of a product and create a product token for the product in transactions by a consumer. The flowchart 3100 begins with the token logic circuitry determining a rate limit associated with the product based on an identity of the consumer in a cryptogram for a transaction (element 3110). In some embodiments, the token logic circuitry may confirm the identity of a consumer by verifying that the content of the cryptogram includes a unique identifier that may also be included in a message that comprises the cryptogram.

After verifying the identity of the consumer, the token logic circuitry may access a consumer profile for the consumer and obtain product purchases associated with one or more rate limits for the product. The token logic circuitry may compare the rate limit with a quantity of purchases of the product by a consumer or via a payment instrument provided for payment for the transaction, the rate limit to limit purchases of the product via the payment instrument or by the consumer associated with the payment instrument (element 3115). For example, the product may be rate limited to consumers regardless of the payment instrument used to perform the purchase so the token logic circuitry may compare the total number of purchases by the consumer of the product with the rate limit for the product.

If the rate limit is higher than the quantity of the product that the consumer purchased, the token logic circuitry may approve the transaction (element 3120). In some embodiments, the token logic circuitry may disapprove the transaction if the quantity of the product that the consumer has already purchased is equal to or exceeds the rate limit for the consumer.

Once the transaction is approved for being within the rate limit for the product, the token logic circuitry may create a product token via the cryptogram (element 3125). The product token may be encoded via the cryptogram and the product token may uniquely identify the product. Thereafter, the token logic circuitry may cause transmission of the product token to the consumer (element 3130). In some embodiments, the token logic circuitry may encode the product token with a private key that is decodable via a public key of a private key/public key pair.

FIG. 13C illustrates a flowchart 3200 to generate a product token. The flowchart 3200 may receive a cryptogram for a transaction (element 3210). The cryptogram may provide transaction and product metadata for the transaction as well as a unique identifier for the payment instrument, an application transaction count, and a merchant identifier. In some embodiments, one or more of the data values in the cryptogram are included unencrypted in a message encompassing the cryptogram. For instance, in some embodiments, an applet version, an application transaction counter value, and a unique identifier are included in the message as unencrypted as well as in the cryptogram as hashed metadata to facilitate authentication of the message and the information contained therein.

The flowchart 3200 may determine transaction metadata and product metadata associated with the transaction (element 3215) and may also determine secret information associated with a consumer (element 3220). The consumer may provide secret information to the token logic circuitry for the purposes of generating an encryption key for the product token. The secret information may otherwise be excluded from the product token, transaction data, and product data so that the consumer, or a representative thereof, must provide the secret information to a token validation service for validation of the product token.

After receiving the cryptogram, metadata, and secret information, the token logic circuitry may generate a message authentication code (MAC) to encrypt a product token, (element 3225). The MAC may comprise a combination of a hash of the transaction metadata and the product metadata, a key based on the cryptogram, and the secret information. Other embodiments may use a public key/private key pair in lieu of the MAC to generate the product token. In further embodiments, the token logic circuitry may hash a digital certificate of authenticity with the MAC or a public key/private key pair to generate a key to encrypt the product token.

After generating a key to encrypt the product token, the token logic circuitry may create a product token (element 3230). The product token may comprise the hash combined with the MAC, a unique identifier for a payment instrument associated with payment for the transaction, an application transaction counter value associated with the payment instrument, and a merchant identifier. The token logic circuitry may also cause transmission of authentication of the product token to the consumer (element 3235). For instance, once the token logic circuitry determines that the purchase of the product by the consumer does not exceed a rate limit, an issuing bank approves the transaction from a financial perspective, and the token logic circuitry generates the product token, the product token may be sent to the consumer directly or via the associated merchant or product originator to complete the transaction.

Figure 14:
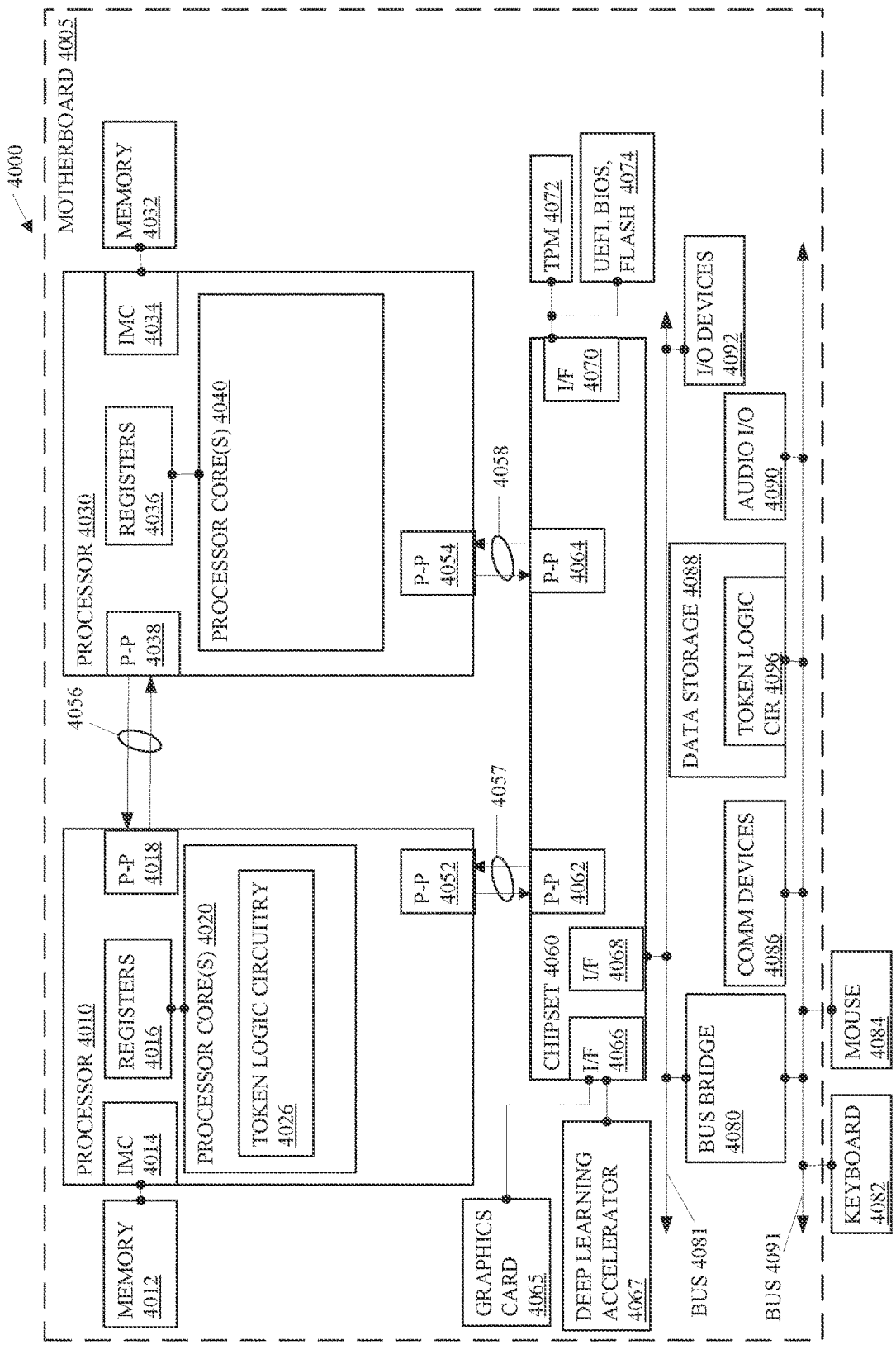
FIG. 14 depicts an embodiment of a system including a multiple-processor platform, a chipset, buses, and accessories such as the devices and servers shown and described in FIGS. 1-13.

FIG. 14 illustrates an embodiment of a system 4000 such as one of the client devices or server(s) shown and discussed in conjunction with FIGS. 1-12. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 14, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include a token logic circuitry 4026 such as the token logic circuitry 1112 and 1160 shown in FIG. 11. The token logic circuitry 4026 may represent circuitry configured to rate limit transactions to purchase a product by a consumer, create a product token for authentication of the product, and/or validate the product token after the purchase of the product within the processor core(s) 4020. In some embodiments, the token logic circuitry 4026 may represent a combination of the circuitry within a processor and a medium to store all or part of the functionality of the token logic circuitry 4026 in memory such as cache, the memory 4012, buffers, registers, and/or the like. In several embodiments, the functionality of the token logic circuitry 4026 resides in whole or in part as code in a memory such as the token logic circuitry 4096 in the data storage unit 4088 attached to the processor 4010 via a chipset 4060 such as the token logic circuitry 2020 shown in FIG. 12. The functionality of the token logic circuitry 4026 may also reside in whole or in part in memory such as the memory 4012 and/or a cache of the processor. Furthermore, the functionality of the token logic circuitry 4026 may also reside in whole or in part as circuitry within the processor 4010 and may perform operations, e.g., within registers or buffers such as the registers 4016 within the processor 4010, registers 4036 within the processor 4030, or within an instruction pipeline of the processor 4010 or the processor 4030.

In other embodiments, more than one of the processor 4010 and 4030 may comprise functionality of the token logic circuitry 4026 such as the processor 4030 and/or the processor within the deep learning accelerator 4067 coupled with the chipset 4060 via an interface (I/F) 4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the unified extensible firmware interface (UEFI), BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the token logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figure 15:
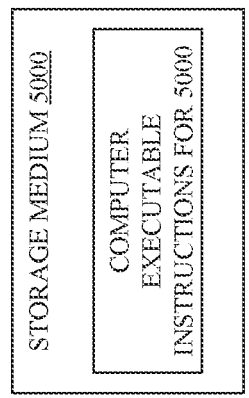
FIGS. 15-16 depict embodiments of a storage medium and a computing platform such as the devices and servers shown in FIGS. 1-14.

FIG. 15 illustrates an example of a storage medium 5000 for rate limitation, token creation and token validation. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 16:
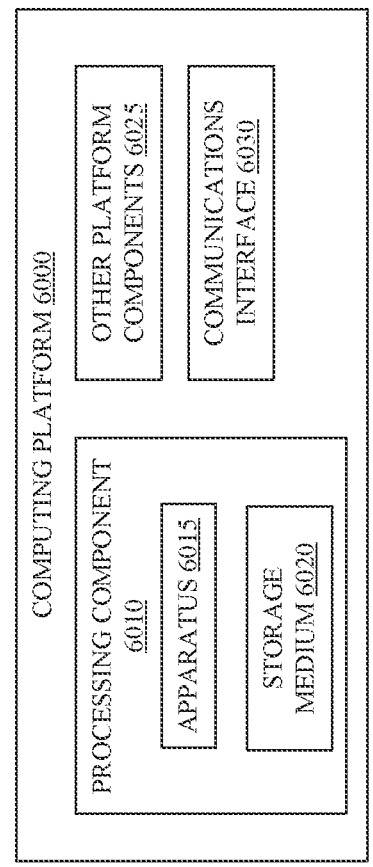

FIG. 16 illustrates an example computing platform 6000. In some examples, as shown in FIG. 16, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources as mentioned above. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein such as the token logic circuitry 1112, 1160, and 2020 illustrated in FIGS. 11-12. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a workstation, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the computing platform 6000 shown in the block diagram of FIG. 16 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/ or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

What is claimed is:

1. An apparatus comprising:
   memory; and
   logic circuitry coupled with the memory to:
      identify a consumer based on a message with a cryptogram provided by a payment instrument of the consumer associated with a transaction for a product;
      determine a physical presence of the payment instrument for the transaction based on the message with the cryptogram;
      determine a rate limit associated with the product;
      compare the rate limit against purchases of the product with the payment instrument, the rate limit to limit purchases of the product via the payment instrument or by the consumer associated with the payment instrument;

approve the transaction based on comparison of the rate limit in response to the rate limit being greater than purchases of the product; and receive transaction metadata associated with the transaction;

receive secret information associated with the consumer;

encode a product token via the cryptogram, the product token to uniquely identify the product and the transaction, wherein encoding of the product token comprises operations to:
  determine a key based on the cryptogram;
  combine a hash of the transaction metadata and product metadata;
  determine the secret information associated with the payment instrument;
  generate a message authentication code (MAC) based on the secret information, the hash, and the key;
  encode the product token via the MAC, wherein the product token excludes the secret information; and
  cause transmission of the product token to the consumer.

2. The apparatus of claim 1, wherein the product token comprises a physical product token, wherein the physical product token comprises a QR code, a bar code, or an electronic file to print or display.

3. The apparatus of claim 1, wherein transmission of the product token comprises transmission of instructions regarding a physical product token to a mail service.

4. The apparatus of claim 3, wherein the transaction metadata comprises information associated with the transaction, comprising a transaction identifier, a price, or a combination thereof.

5. The apparatus of claim 1, further comprising the logic circuitry to receive the product metadata and hashing the product metadata, wherein the product token comprises a hash of the product metadata.

6. The apparatus of claim 5, wherein the product metadata comprises information associated with the product, comprising a size, a model number, a serial number, a picture of the product, a certificate of authenticity, or a combination thereof.

7. The apparatus of claim 1, further comprising the logic circuitry to disapprove the transaction based on the comparison in response to the rate limit being greater than purchases of the product.

8. The apparatus of claim 2, further comprising the logic circuitry to authenticate the product token, the logic circuitry to:
  receive the product token;
  receive cryptogram from the transaction;
  receive the transaction metadata and the product metadata associated with the product token;
  determine secret information of the consumer;
  determine the MAC to decrypt the product token;
  decrypt the product token via the cryptogram;
  verify that the transaction metadata and the product metadata associated with the product token match metadata within the product token based on decryption of the product token to authenticate the product token; and
  cause transmission of authentication of the product token to requestor.

9. The apparatus of claim 8, wherein logic circuitry to determine the secret information comprises logic circuitry to receive the secret information from the requestor.

10. A non-transitory storage medium containing instructions, which when executed by a processor, cause the processor to perform operations, the operations to:
  determine a rate limit associated with a product based on an identity of a consumer in a cryptogram for a transaction;
  compare the rate limit with a quantity of purchases of the product with a payment instrument provided for payment for the transaction, the rate limit to limit purchases of the product via the payment instrument or by the consumer associated with the payment instrument;
  approve the transaction based on comparison of the rate limit in response to the rate limit being greater than purchases of the product;
  receive transaction metadata associated with the transaction;
  receive secret information associated with the consumer; and
  create a product token wherein creation of the product token comprises operations to:
    determine a key based on the cryptogram;
    combine a hash of the transaction metadata and product metadata;
    determine the secret information associated with the payment instrument;
    generate a message authentication code (MAC) based on the secret information, the hash, and the key;
    encode the product token via the MAC, wherein the product token excludes the secret information; and
  cause transmission of the product token to the consumer.

11. The non-transitory storage medium of claim 10, wherein the product token comprises a physical product token, wherein the physical product token comprises a QR code, a bar code, or an electronic file to print or display.

12. The non-transitory storage medium of claim 10, wherein transmission of the product token comprises physical transmission of a physical product token via a mail service.

13. The non-transitory storage medium of claim 12 wherein the transaction metadata comprises information associated with the transaction, comprising a transaction identifier, a price, or a combination thereof.

14. The non-transitory storage medium of claim 10, wherein the operations further comprise operations to receive the product metadata and hashing the product metadata, wherein the product token comprises a hash of the product metadata.

15. The non-transitory storage medium of claim 14, wherein the product metadata comprises information associated with the product, comprising a size, a model number, a serial number, a picture of the product, a certificate of authenticity, or a combination thereof.

16. The non-transitory storage medium of claim 10, wherein the operations further comprise operations to disapprove the transaction based on the comparison in response to the rate limit being greater than purchases of the product.

17. The non-transitory storage medium of claim 11, wherein the operations further comprise operations to:
  receive the product token;
  receive the cryptogram from the transaction;
  receive the transaction metadata and the product metadata associated with the product token;
  determine the secret information;
  determine key to decrypt the product token;
  decrypt the product token via the key, the key based on the cryptogram;

verify that the transaction metadata and the product metadata associated with the product token match metadata within the product token based on decryption of the product token to authenticate the product token; and cause transmission of authentication of the product token to requestor.

18. The non-transitory storage medium of claim 17, wherein the operations further comprise operations to determine the secret information comprises logic circuitry to receive the secret information from the requestor.

19. The non-transitory storage medium of claim 10, wherein the product token encoded via the cryptogram is encoded with a private key and decodable via a public key.

20. A system comprising:
memory; and
logic circuitry coupled with the memory to
receive a cryptogram for a transaction;
determine transaction metadata and product metadata associated with the transaction;
determine secret information associated with a consumer;
generate a message authentication code (MAC) to encrypt a product token, the MAC comprising a combination of a hash of the transaction metadata and the product metadata, a key based on the cryptogram, and the secret information;
create the product token, the product token comprising the hash combined with the MAC, a unique identifier for a payment instrument associated with payment for the transaction, an application transaction counter associated with the payment instrument, and a merchant identifier, wherein the product token comprises a physical product token, wherein the physical product token comprises a QR code, a bar code, or an electronic file to print or display; and
cause transmission of authentication of the product token to the consumer via a mail service.

\* \* \* \* \*